US006790142B2

(12) United States Patent
Okada et al.

(10) Patent No.: US 6,790,142 B2
(45) Date of Patent: Sep. 14, 2004

(54) ADVERTISEMENT DISTRIBUTION SYSTEM AND SERVER

(75) Inventors: Kazuo Okada, Tokyo (JP); Jun Fujimoto, Tokyo (JP); Nobuyuki Nonaka, Tokyo (JP); Koji Nakagawa, Tokyo (JP)

(73) Assignees: Aruze Corporation, Tokyo (JP); Seta Corporation, Tokyo (JP)

( * ) Notice: Subject to any disclaimer, the term of this patent is extended or adjusted under 35 U.S.C. 154(b) by 183 days.

(21) Appl. No.: 10/114,267

(22) Filed: Apr. 3, 2002

(65) Prior Publication Data

US 2002/0155891 A1 Oct. 24, 2002

(30) Foreign Application Priority Data

Apr. 4, 2001 (JP) ........................ P2001-105628

(51) Int. Cl.[7] .............. A63F 9/24; G06F 17/60
(52) U.S. Cl. ................ 463/42; 463/16; 463/20; 463/40; 704/14
(58) Field of Search .............. 463/16, 20, 25, 463/40, 41, 42, 30, 31; 705/14; 273/138.1, 138.2, 143 R

(56) References Cited

U.S. PATENT DOCUMENTS

| | | | | |
|---|---|---|---|---|
| 5,231,568 A | * | 7/1993 | Cohen et al. .................. | 463/17 |
| 5,643,088 A | * | 7/1997 | Vaughn et al. ................ | 463/40 |
| 5,941,772 A | * | 8/1999 | Paige .......................... | 463/20 |
| 6,036,601 A | * | 3/2000 | Heckel ........................ | 463/42 |
| 6,186,893 B1 | * | 2/2001 | Walker et al. ................ | 463/20 |
| 6,196,920 B1 | * | 3/2001 | Spaur et al. .................. | 463/42 |
| 6,264,560 B1 | * | 7/2001 | Goldberg et al. ............. | 463/42 |
| 6,379,251 B1 | * | 4/2002 | Auxier et al. ................ | 463/42 |
| 6,625,578 B2 | * | 9/2003 | Spaur et al. .................. | 705/14 |
| 6,645,068 B1 | * | 11/2003 | Kelly et al. ................... | 463/9 |
| 2001/0041609 A1 | * | 11/2001 | Oranges et al. .............. | 463/16 |
| 2002/0065746 A1 | * | 5/2002 | Lewis .......................... | 705/27 |

* cited by examiner

Primary Examiner—Jessica J. Harrison
(74) Attorney, Agent, or Firm—Oblon, Spivak, McClelland, Maier & Neustadt, P.C.

(57) ABSTRACT

An advertisement distribution system includes servers and a terminal. The servers prepare distribution information containing game information and advertisement information and transmits the prepared distribution information to the terminal. The terminal displays a game screen using the game information included in the distribution information, and also displays the advertisement information included in the distribution information on the game screen.

20 Claims, 17 Drawing Sheets

FIG.3

GAME INFO DATABASE 2d

| GAME NO. | GAME PROGRAM NO. | GAME SETTINGS ||||||
|---|---|---|---|---|---|---|
| | | MANAGEMENT NO. | FREE/PAY | PROBABILITY | PRIZE | PERIOD |
| G001 | P001 | C001 | FREE | 1/500 | PRIZE001 | 2001. 1-3 |
| G002 | P002 | C002 | PAY | 1/375 | PRIZE002 | 2001. 2-3 |
| G003 | P003 | C003 | FREE | 1/500 | PRIZE003 | 2001. 4-5 |
| G004 | P004 | C004 | PAY | 1/250 | PRIZE004 | 2001. 2-3 |
| G005 | P011 | C005 | FREE | 1/500 | PRIZE011 | 2001. 3-4 |
| G006 | P012 | C006 | FREE | 1/550 | PRIZE012 | 2001. 3-3 |
| G007 | P013 | C007 | FREE | 1/600 | PRIZE013 | 2001. 3-5 |
| G008 | P014 | C008 | PAY | 1/250 | PRIZE014 | 2001. 5-6 |
| : | : | : | : | : | : | : |

FIG.4

AD INFO DATABASE 2e

| AD NO. | ADVERTISER NAME | CHARACTER DATA | FIGURE DATA | SOUND DATA |
|---|---|---|---|---|
| A001 | ABC Co. | MD001 | FD001 | MS001 |
| A002 | ABC Co. | MD002 | FD002 | MS002 |
| A003 | ABC Co. | MD003 | FD003 | MS003 |
| A004 | ABC Co. | MD004 | FD004 | MS004 |
| A005 | XYZ Co. | MD011 | FD011 | MS011 |
| A006 | XYZ Co. | MD012 | FD012 | MS012 |
| A007 | XYZ Co. | MD013 | FD013 | MS013 |
| A008 | XYZ Co. | MD014 | FD014 | MS014 |
| : | : | : | : | : |

FIG.5

DISTRIBUTION INFO DATABASE 2f

| AD NO. | ADVERT-ISER NAME | CHARAC-TER DATA | FIGURE DATA | GAME NO. | GAME PROGRAM NO. | GAME SETTINGS |
|---|---|---|---|---|---|---|
| A001 | ABC Co. | MD001 | FD001 | G001 | P001 | C001 |
| A002 | ABC Co. | MD002 | FD002 | G002 | P002 | C002 |
| A003 | ABC Co. | MD003 | FD003 | G003 | P003 | C003 |
| A004 | ABC Co. | MD004 | FD004 | G004 | P004 | C004 |
| A005 | XYZ Co. | MD011 | FD011 | G005 | P011 | C005 |
| A006 | XYZ Co. | MD012 | FD012 | G006 | P012 | C006 |
| A007 | XYZ Co. | MD013 | FD013 | G007 | P013 | C007 |
| A008 | XYZ Co. | MD014 | FD014 | G008 | P014 | C008 |
| ⋮ | ⋮ | ⋮ | ⋮ | ⋮ | ⋮ | ⋮ |

FIG.6

GAME HISTORY DATABASE 2g

| GAME NO. | ADVERTISER NAME | NUMBER OF EXECUTION (WINNING) | WINNING HISTORY | | | |
|---|---|---|---|---|---|---|
| | | | HISTORY NO. | DATE | CUSTOMER NO. | PRIZE |
| G001 | ABC Co. | 25000 (40) | Re001-01 | 2001.1.1 | B011 | PRIZE001-1 |
| | | | Re001-02 | 2001.1.1 | A101 | PRIZE001-2 |
| | | | Re001-03 | 2001.1.2 | A303 | PRIZE001-1 |
| | | | Re001-04 | 2001.1.2 | A411 | PRIZE002-1 |
| G002 | ABC Co. | 50000 (75) | Re002-01 | 2001.2.1 | B011 | PRIZE002-1 |
| | | | Re002-02 | 2001.2.1 | A101 | PRIZE002-4 |
| | | | Re002-03 | 2001.2.2 | A303 | PRIZE002-5 |
| | | | Re002-04 | 2001.2.2 | A411 | PRIZE002-1 |
| | | | Re002-05 | 2001.2.2 | C005 | PRIZE002-1 |
| | | | Re002-06 | 2001.2.2 | C223 | PRIZE002-2 |
| ⋮ | ⋮ | ⋮ | ⋮ | ⋮ | ⋮ | ⋮ |

FIG.7

CUSTOMER DATABASE 2h

| CUSTOMER NO. | ADDRESS | ID CODE | CUSTOMER NAME | CREDIT CARD NO. | ACCESS HISTORY |||
|---|---|---|---|---|---|---|---|
| | | | | | GAME NO. | NUMBER OF EXECUTION | RESULT |
| A001 | ad123-456 | qwerty | *** | 111-222 | G001 | 10 | — |
| | | | | | G003 | 25 | HISTORY NO. |
| | | | | | G012 | 2 | — |
| | | | | | G015 | 10 | — |
| A002 | ad123-789 | asdfgh | *** | 122-333 | G002 | 3 | — |
| | | | | | G003 | 12 | — |
| | | | | | G008 | 8 | — |
| ⋮ | ⋮ | ⋮ | ⋮ | ⋮ | ⋮ | ⋮ | ⋮ |

FIG.8

ADVERTISER DATABASE 2i

| ADVERTISER NAME | GAME NO. | ACCESS INFO ||||
|---|---|---|---|---|---|
| | | DATE | ACCESS NUMBER HISTORY | USER NUMBER HISTORY | TOTAL NUMBER OF ACCESS | TOTAL NUMBER OF USER |
| ABC Co. | G001 | 2001.1.1 | 512 | 222 | 512 | 222 |
| | | 2001.1.2 | 401 | 125 | 913 | 347 |
| | | ⋮ | ⋮ | ⋮ | ⋮ | ⋮ |
| | G002 | 2001.2.1 | 787 | 312 | 787 | 312 |
| | | 2001.2.2 | 1558 | 473 | 2343 | 785 |
| | | ⋮ | ⋮ | ⋮ | ⋮ | ⋮ |
| ⋮ | ⋮ | ⋮ | ⋮ | ⋮ | ⋮ | ⋮ |
| xyz Co. | G005 | 2001.3.1 | 689 | 185 | 689 | 185 |
| | | 2001.3.2 | 388 | 99 | 1077 | 284 |
| | | ⋮ | ⋮ | ⋮ | ⋮ | ⋮ |
| | G006 | 2001.3.1 | 852 | 416 | 852 | 416 |
| | | 2001.3.2 | 1002 | 565 | 1854 | 981 |
| | | ⋮ | ⋮ | ⋮ | ⋮ | ⋮ |
| ⋮ | ⋮ | ⋮ | ⋮ | ⋮ | ⋮ | ⋮ |

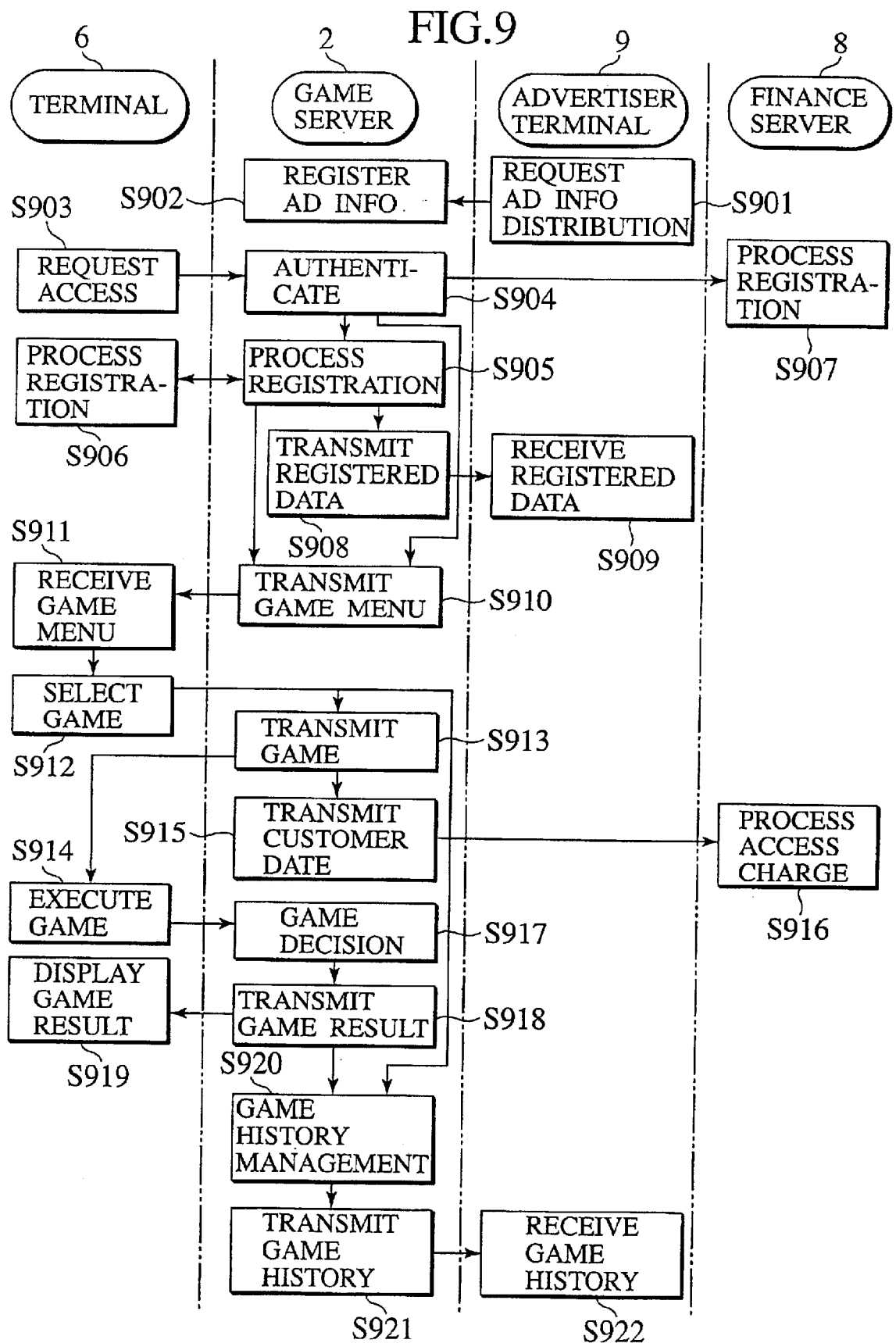

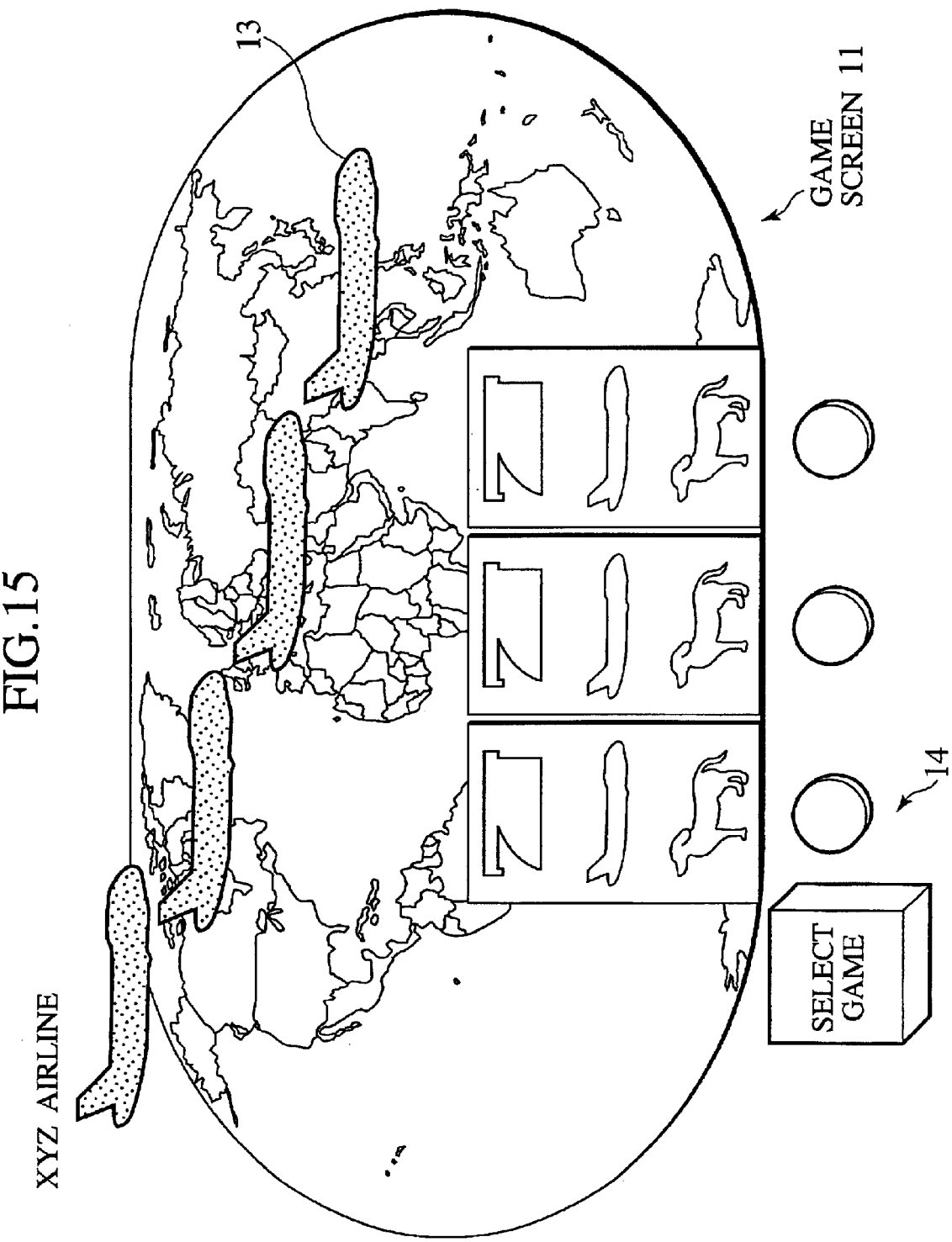

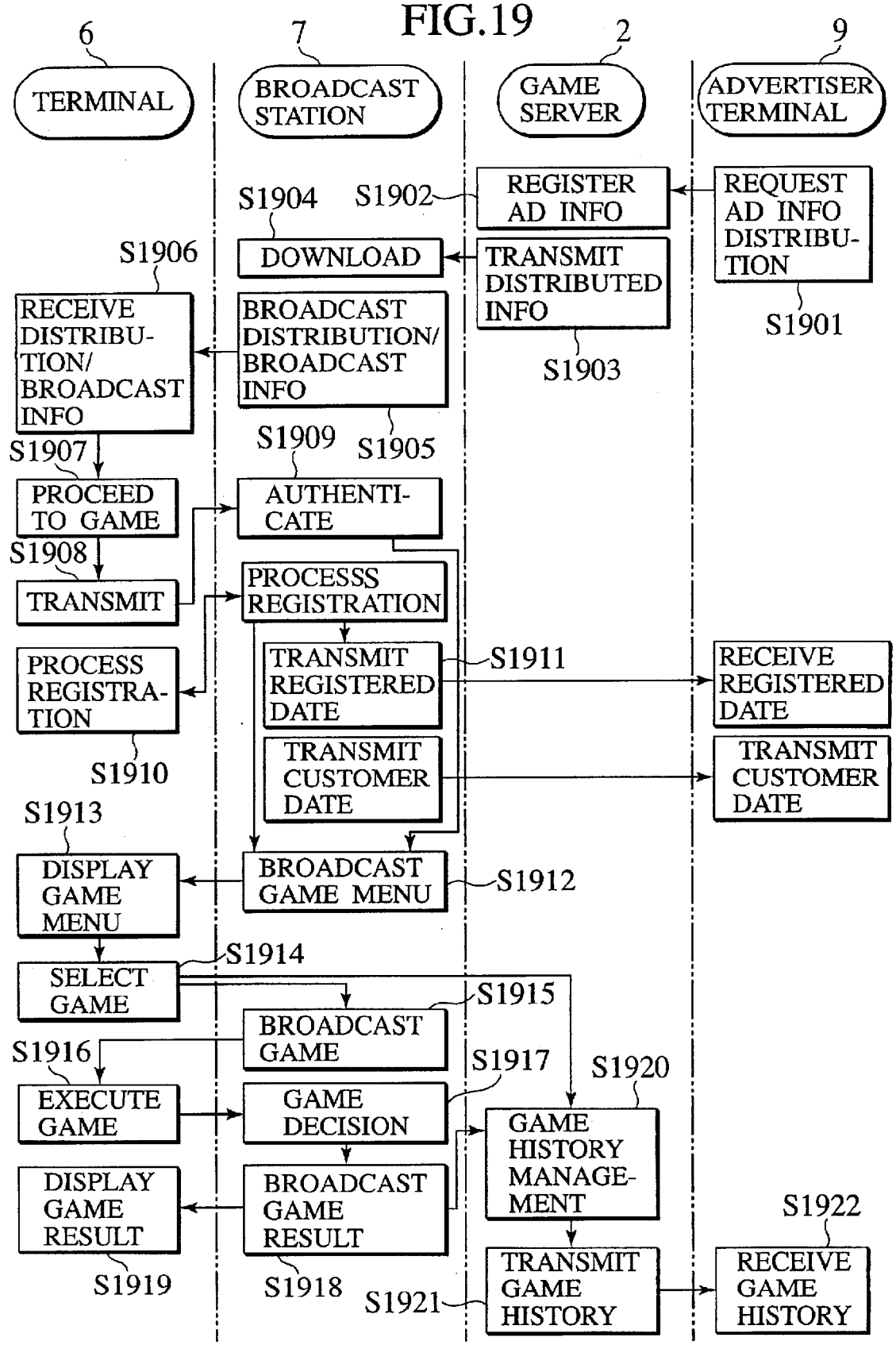

ADVERTISEMENT DISTRIBUTION SYSTEM AND SERVER

BACKGROUND OF THE INVENTION

1. Field of the Invention

This invention relates to an advertisement system for transmitting advertisement information to terminals via a network for promotion, and a server suitable for use in the system.

2. Description of the Related Art

Conventionally known is an advertisement system which displays advertisement information called a "banner" on part of a display screen of a home page or the like at a terminal.

In such a system, a banner displayed on part of a display screen of a home page or the like exerts its advertising effects. A user viewing the banner and having an interest can call a server linked to the banner to get more detailed advertisement information. This increases the advertisement effectiveness.

Also known is an advertisement system via television broadcast.

The above conventional system of only displaying a banner on part of a display screen tries to design a more attractive display screen and/or offers gifts so as to attract users' attention or interest. However, the degree of users' attention to such an advertisement display is limited or not so high, resulting in advertisement not always exerting its largest effects.

In the conventional advertising system via television broadcast, advertisement is provided to users through television broadcast in one-way communications, being unlikely to have high advertising effects.

SUMMARY OF THE INVENTION

It is thus an object of the present invention to provide an advertisement distribution system overcoming the above conventional problems and having much higher advertising effects by displaying advertisement information on a game executed via a network, and a server suitable for use in the system.

An advertisement distribution system according to the present invention comprises: a server preparing distribution information comprising game information and advertisement information for transmission; and at least one terminal receiving the distribution information from the server, the terminal displaying a game screen using the game information included in the distribution information, and displaying the advertisement information included in the distribution information on the game screen.

Thus, the terminal displays the advertisement information included in the distribution information received on the game screen displayed using the game information included in the distribution information when a user is executing a game using the terminal, so that the chance of making the user view the advertisement information is increased, thereby providing higher advertisement effects.

In the above advertisement distribution system, the advertisement information preferably comprises image information, sound information, or a combination thereof.

Also, the advertisement information preferably comprises an advertiser's name, a product name, a service name, the substance of a product, the substance of a service, or any combination thereof.

Thus, the advertisement information can be made from predetermined music (such as a theme song or a commercial song) or from voice expressions or image expressions (such as a character, figure or picture) of the name of a product or service, an advertiser, a catch phrase or the like, so as to increase the advertisement effects.

In the above advertisement distribution system, the game information preferably comprises a plurality of game display elements constituting the game screen; and the server preferably changes at least one of the game display elements included in the game information into the advertisement information, thereby preparing the distribution information.

Thus, the game screen with at least one of the game display elements changed into the advertisement information is displayed, that is, the advertisement information is always displayed on the game screen, so that a user would inevitably view the advertisement information during playing a game, resulting in increased advertisement effects.

In the above advertisement distribution system, the server preferably prepares the distribution information comprising the game display elements and/or the advertisement information which have been selected by the terminal.

Thus a game of a type of pushing down a selection button or the like to select game display elements or advertisement information displayed on a game screen, such as a slot machine game or a roulette game can be provided.

Also, the server preferably stores a winning history when the terminal selects predetermined advertisement information or a predetermined combination of the advertisement information.

Thus in a game of the above-described type of selecting game display elements or advertisement information, when predetermined advertisement information or a predetermined combination of advertisement information is selected, it is decided as a "win of the game" and added value such as offering a gift is provided to the user, thereby increasing users' commitment to the game and increasing the chance of users' viewing the advertisement information, providing increased advertisement effects.

Also, the server preferably prepares the distribution information based on a result of a game executed by the terminal using the game information.

Thus advertisement information included in a game screen can be changed based on a result of the game in which a user has great interest, increasing the chance of the user's viewing the advertisement information, resulting in increased advertisement effects.

Also, the server preferably stores a winning history when having prepared predetermined distribution information.

Thus the decision of a "win of a game" is made when the user clears the game, thereby increasing the commitment of the user to the game and increasing the chance of users' viewing the advertisement information, and providing increased advertisement effects.

In the above advertisement distribution system, the game is preferably a slot machine game with a plurality of rotatable drums on which the game display elements and/or the advertisement information are disposed; and the server preferably stores a winning history when the advertisement information on the drums constitutes a predetermined combination in at least one of a vertical, lateral or slanting direction.

Thus a slot machine game in which a plurality of game display elements or advertisement information is displayed on a game screen and the decision of a "win of the game"

is made depending on a combination of advertisement information selected by the user pushing down selection buttons can be provided.

In the above advertisement distribution system, the server preferably comprises a game server storing the game information and an advertisement server storing the advertisement information; and the game server preferably imports the advertisement information from the advertisement server, and prepares the distribution information comprising the advertisement information imported and the game information stored therein.

Further, in the above advertisement distribution system, the server preferably comprises a game server storing the game information and the advertisement information, and a broadcast station; and the broadcast station preferably imports the game information and the advertisement information from the game server, prepares the distribution information comprising the imported advertisement and game information, and transmits the prepared distribution information to the terminal by means of broadcasting.

Further, in the above advertisement distribution system, the server preferably comprises an advertisement server storing the advertisement information, a game server storing the game information, and a broadcast station; and the broadcast station preferably imports the advertisement information from the advertisement server, imports the game information from the game server, prepares the distribution information comprising the imported advertisement and game information, and transmits the prepared distribution information to the terminal by means of broadcasting.

Thus using bothway communications between the terminal and the broadcast station, users' response can be obtained, resulting in more effective advertisement.

Further, in the above advertisement distribution system, the server preferably comprises an advertisement server storing the advertisement information, a game server storing the game information, and a broadcast station; the game server preferably imports the advertisement information from the advertisement server and prepares the distribution information comprising the imported advertisement information and the game information stored therein; and the broadcast station preferably imports the distribution information from the game server and transmits the imported distribution information to the terminal by means of broadcasting.

These and other features and advantages of the present invention will be more readily apparent from the following detailed description of preferred embodiments and the accompanying drawings.

BRIEF DESCRIPTION OF THE DRAWINGS

FIG. 3 is a diagram exemplarily illustrating a game information database in the advertisement distribution system as shown in FIG. 2;

FIG. 4 is a diagram exemplarily illustrating an advertisement information database in the advertisement distribution system as shown in FIG. 2;

FIG. 5 is a diagram exemplarily illustrating a distribution information database in the advertisement distribution system as shown in FIG. 2;

FIG. 6 is a diagram exemplarily illustrating a game history database in the advertisement distribution system as shown in FIG. 2;

FIG. 7 is a diagram exemplarily illustrating a customer database in the advertisement distribution system as shown in FIG. 2;

FIG. 8 is a diagram exemplarily illustrating an advertiser database in the advertisement distribution system as shown in FIG. 2;

FIG. 9 is a flowchart illustrating the operation of the advertisement distribution system as shown in FIG. 2;

FIG. 15 is a diagram exemplarily illustrating a game screen displayed on a terminal in the advertisement distribution system as shown in FIG. 2;

FIG. 19 is a flowchart illustrating the operation of the advertisement distribution system as shown in FIG. 18.

DETAILED DESCRIPTION OF THE PREFERRED EMBODIMENTS

With reference to the accompanying drawings, an advertisement distribution system 1 according to the present invention will be described in detail below.

Figure 1:
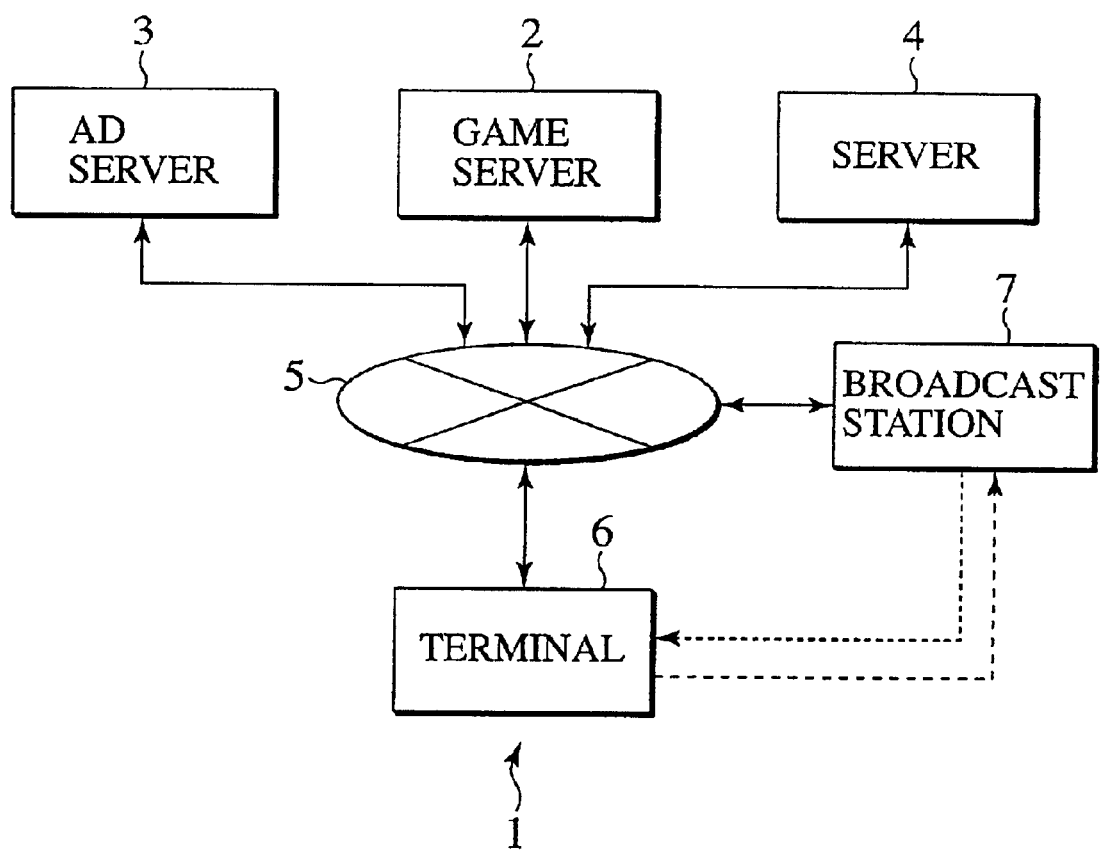
FIG. 1 is a diagram illustrating an entire configuration of an advertisement distribution system of the present invention.

Referring to FIG. 1, the advertisement distribution system 1 of the present invention includes a game server 2, an advertisement server 3, a server 4, a network 5, a terminal 6, and a broadcast station 7.

One or more of the game server 2, advertisement server 3 and broadcast station 7 constitute a server (advertisement distributing means) for preparing distribution information containing game information and advertisement information and transmitting the prepared information to the terminal 6.

The terminal 6 displays a game screen using the game information included in the distribution information and displays the advertisement information included in the distribution information on the same game screen.

The network 5 includes a public switched telephone network (PSTN), data communications network, satellite network, and also includes a broadcast network such as broadcast channels with data broadcasting and a cable television. The server 4 includes a finance server 8 and an advertiser terminal 9.

Configuration of Advertisement Distribution System According to Embodiment 1 of the Present Invention An advertisement distribution system 1 according to embodiment 1 of the present invention will be described with reference to FIGS. 2 and 3. In this embodiment, the game server 2 constitutes a server for preparing distribution information containing game and advertisement information and transmitting the prepared information to the terminal 6. The advertisement distribution system 1 of this embodiment does not necessarily include the broadcast station 7.

Figure 2:
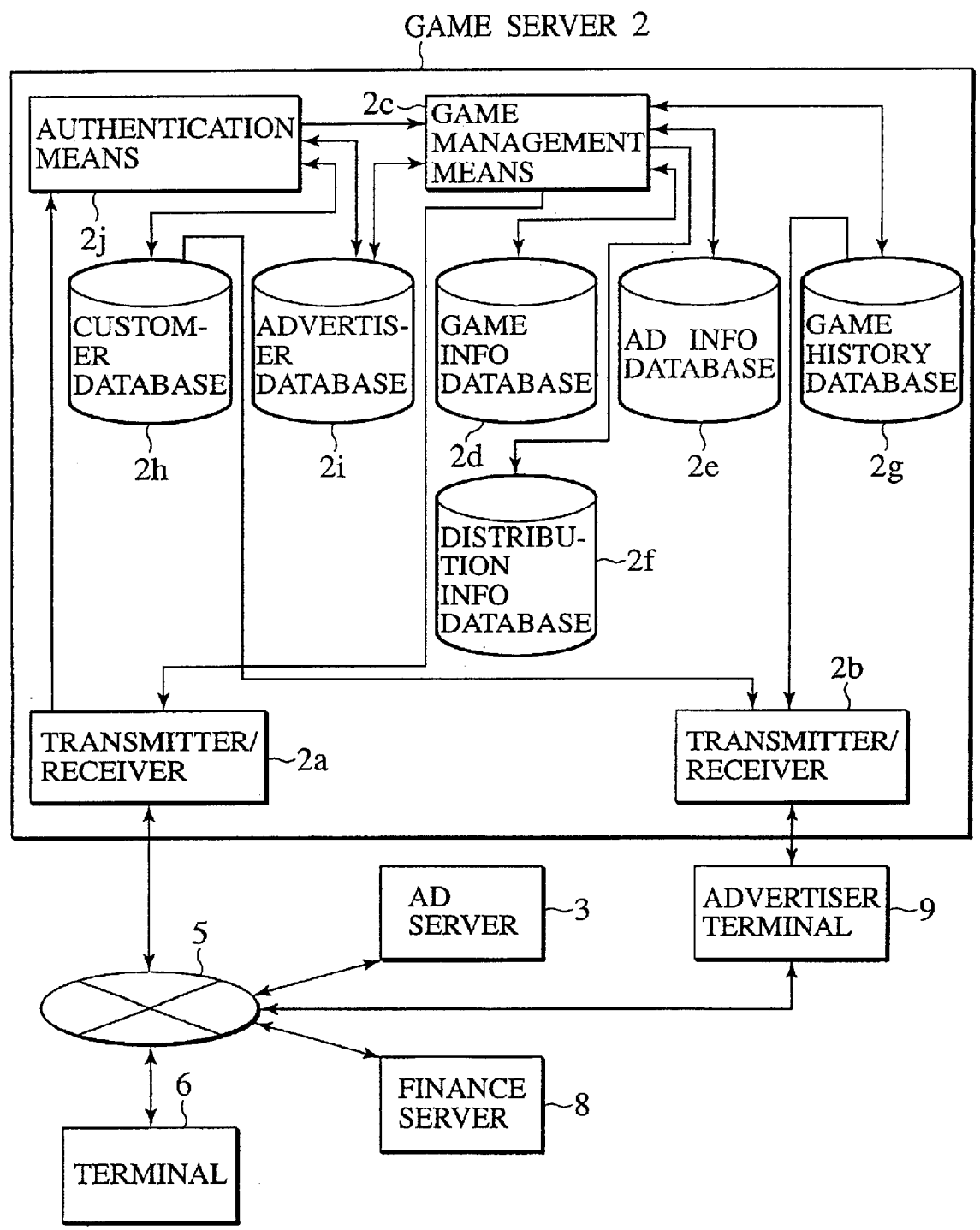
FIG. 2 is a functional block diagram illustrating an advertisement distribution system according to an embodiment of the present invention.

FIG. 2 is an entire configuration of the advertisement distribution system 1 of this embodiment, and mainly illustrates functional blocks of the game server 2.

The game server 2 is connected to the network 5 via a transmitter/receiver 2a, and transmits game information to the terminal 6 via the network 5. The game server 2 includes a plurality of databases 2d to 2i, transmits various kinds of information stored in the databases 2d to 2i to the terminal 6 via the network 5, and stores various kinds of information obtained via the network 5 in the databases 2d to 2i.

In the present embodiment, the game server 2 imports advertisement information from the advertisement server 3, prepares and transmits distribution information containing the imported advertisement information and game information stored in the game information database 2d.

Specifically, as shown in FIG. 2, the game server 2 includes transmitters/receivers 2a and 2b, a game management means 2c, a game information database 2d, an advertisement information database 2e, a distribution information database 2f, a game history database 2g, a customer database 2h, an advertiser database 2i, and an authentication means 2j.

The transmitter/receiver 2a is connected to the game management means 2c and the authentication means 2j, and transmits/receives information to/from the advertisement server 3, terminal 6, finance server 8 and advertiser terminal 9 via the network 5.

The transmitter/receiver 2b is connected to the game history database 2g and the customer database 2h, and transmits/receives information to/from the advertiser terminal 9.

The transmitter/receiver 2a or 2b transmits customer data stored in the customer database 2h and game history data stored in the game history database 2g to the advertiser terminal 9 via the network 5 or directly.

The game management means 2c is connected to the transmitter/receiver 2a, game information database 2d, advertisement information database 2e, distribution information database 2f, game history database 2g, advertiser database 2i and authentication means 2j, and manages such various kinds of databases.

The game management means 2c reads distribution information with advertisement information incorporated into game information from the distribution information database 2f, and transmits the distribution information from the transmitter/receiver 2a via the network 5 to the terminal 6. The game management means 2 cooperates with the terminal 6 via the network 5 to enable a user to execute a game, and stores a result of the game in the game history database 2g.

When the authentication means 2j determines that the advertiser terminal 9 having transmitted an access request is stored in the advertiser database 2i, the game management means 2c registers advertisement information transmitted from the advertiser terminal 9 in the advertisement information database 2e, and changes or renews the advertisement information in the advertisement information database 2e in accordance with the advertisement information transmitted from the advertiser terminal 9.

The game information database 2d stores game information for the terminal 6 to execute a game. FIG. 3 illustrates an exemplary game information database. The game information database 2d stores "game management numbers," "game program numbers," and "game settings" associated with one another.

The game information database 2d stores the "game program numbers" identifying respective game programs (game information). The game programs are stored in a database dedicated to the programs. The game information database 2d stores "Free/Pay" information indicating whether the corresponding game is a free, public game, or a pay, registration-requiring game, "probability" indicating the probability of winning the corresponding game, "the substance of prizes," and "period" indicating the period in which the corresponding game can be executed, which information items are associated with one another. Here, a public game requires no access charge and a registration-requiring game requires access charge.

The advertisement information database 2e stores advertisement information for promotion use, that is, advertisers' names and advertisement information to be displayed on a game screen of the terminal 6.

The advertisement information consists of image information (such as characters, figures, and pictures), sound information (such as music and voice), or any combination thereof for displaying an advertiser's name, product name, service name, the substance of a product or a service, or any combination thereof.

FIG. 4 illustrates an exemplary advertisement information database 2e. The advertisement information database 2e stores "advertisement information management numbers," "advertisers' names," "character data," "figure data," and "sound data" for identifying advertisement information, which information items are associated with one another.

The distribution information database 2f stores distribution information prepared by incorporating advertisement information into game information for transmission. FIG. 5 illustrates an exemplary distribution information database 2f. The distribution information database 2f stores "advertisement information management numbers," "advertisers' names," "character data," "figure data," "game management numbers," "game program numbers," and "game settings," which information items are associated with one another.

The distribution information database 2f is prepared by referring to the game information database 2d shown in FIG. 3 and the advertisement information database 2e shown in FIG. 4. The distribution information database 2f is not necessarily configured to be an individual database, and may be configured by associating the advertisement information database 2e with the game information database 2d.

Distribution information is prepared by changing at least one game display element included in a game program (game information) into advertisement information (character data or figure data), that is, by incorporating advertisement information into game information.

The game history database 2g stores game history data such as game execution state and game results. FIG. 6 illustrates an exemplary game history database 2g. The game history database 2g stores "game management numbers," "advertisers' names," "number of execution (winning)," and "winning history," which information items are associated with one another.

The game history database 2g stores data for each game specified by a "game management number," which data holding executed state of the game such as the number of execution and the winning history of the game, and results of the game. In the present embodiment, the game history database 2g stores, as the "winning history," "history numbers," "dates" of winnings, "customer numbers" of customers winning prizes and "the substance of prizes," which are associated with one another. The manager of the game server 2 can utilize the game history database 2g for sending prizes or the like.

The customer database 2h stores information of users registered in the game server 2 (customer data). FIG. 7 illustrates an exemplary customer database 2h. The customer database 2h stores "customer management numbers," "addresses" indicating the addresses of the terminals of customers who executed games, "ID codes" for identifying customers to be used for authenticating accesses to pay games, "customers' names," "credit card numbers" for billing access charges for pay game use, and "access history" indicating histories of games executed by the customers, which information items are associated with one another. The customer database 2h stores, as the "access history," "game management numbers," "number of execution," and "game results." The "history numbers" stored in the game history database 2g may be stored as the "game results."

The advertiser database 2i stores information of advertisers. FIG. 8 illustrates an exemplary advertiser database 2i. The advertiser database 2i stores "advertisers' names" identifying advertisers, "game management numbers" for identifying games to which advertisement information is to be incorporated, and "access information," which information items are associated with one another.

The advertiser database 2i stores, as the "access information," "dates" indicating the dates of use of the games, "access number history," "user number history," "total number of access," and "total number of users," which information items are associated with one another. The advertisers can refer to the advertiser database 2i to control or check the access to their advertisements accompanying the use of the games.

The game server 2 may include another database in addition to the above-described databases 2d to 2i, for importing advertisement information from the advertisement server 3 and preparing and transmitting distribution information containing the imported advertisement information and game information stored in the game information database 2d.

The authentication means 2j is connected to the transmitter/receiver 2a, game management means 2c, customer database 2h and advertiser database 2i, and upon receiving an access request from the customer of the terminal 6 via the network 5 and the transmitter/receiver 2a, searches customer data stored in the customer database 2h to determine whether the customer is registered or not.

Thus the authentication means 2j can determine whether the customer having transmitted the access request can participate in a pay game, and also can invite customers not registered to registration.

Upon receiving an access request from the advertiser terminal 9, the authentication means 2j searches advertiser information stored in the advertiser database 2i to determine whether the advertiser terminal 9 is registered or not.

The terminal 6 receives distribution information from the game server 2 via the network, and displays a game screen using game information included in the distribution information received, and also displays advertisement information included in the distribution information on the game screen.

The advertisement server 3 stores advertisement information transmitted from the advertiser terminal 9. The advertisement server 3 transmits advertisement information to the game server 2 according to a direction from the advertiser terminal 9.

The advertiser terminal 9 stores advertisement information in the advertisement server 3 or in the game server 2 according to a direction from the advertiser. The finance server 8 collects access charges from a customer, using the customer data when the customer participated in a pay game.

Operation of Advertisement Distribution System According to Embodiment 1 of the Present Invention With reference to FIG. 9, the operation of the advertisement distribution system 1 according to embodiment 1 of the present invention will be described.

At step 901 in FIG. 9, upon receiving a request for distribution of advertisement information from the advertiser terminal 9, the game server 2 stores information relating to the advertiser in the advertiser database 2i and sets a data area for the advertiser in the advertisement information database 2e to register the advertiser. The advertisement information is downloaded from the advertisement server 3 via the network to the advertisement information database 2e, for example.

At step 902, the game management means 2c incorporates the advertisement information stored in the advertisement information database 2e into game information stored in the game information database 2d to prepare distribution information, which is then stored in the distribution information database 2.

At step 903, the game server 2 receives an access request from the terminal 6.

At step 904, the authentication means 2j of the game server 2 checks an ID code stored in the customer database 2h against an ID code included in the access request, thereby determining whether the customer of the terminal 6 is registered or not.

When newly registering the customer, at steps 905 and 906, the game server 2 and the terminal 6 perform registration processing and store obtained customer data in the customer database 2h.

Here the game server 2 can transmit the registered customer data to the advertiser terminal 9 at the time of registration or at the request of the advertiser (step 908). The advertiser can utilize the customer data (step 909).

When the customer participates in a pay game and a financial institution is commissioned to collect access charges, the game server 2 transmits customer data related to the customer to the finance server 8 to make the financial institution perform registration processing at step 907.

At step 910, upon authentication or registration, the game server 2 transmits a game menu of games stored in the game information database 2d or the distribution information database 2f to the terminal 6. At step 911, the terminal 6 receives the transmitted game menu. At step 912, the customer of the terminal 6 selects a game to execute from the game menu displayed on the display screen of the terminal 6.

At step 913, the game server 2 reads the distribution information including the game information which allows the game selected by the customer to be executed on the terminal 6 from the distribution information database 2f for transmission.

At step 914, the terminal 6 executes the game on the display screen using the transmitted distribution information. The terminal 6 displays a game screen using the game information included in the distribution information and also displays the advertisement information on the game screen.

At step 915, the game server 2 transmits information on the selection of a pay game by the customer when the customer selects the pay game or information on which pay game is selected to the finance server 8. At step 916, the finance server 8 bills access charges for each customer using the received information.

At step 917, the game server 2 decides a result of the game. At step 918, the game server 2 transmits the game result or distribution information prepared in accordance with the game result to the terminal 6.

At step 919, the terminal 6 displays the received game result or distribution information on the display screen.

It is also possible that the terminal 6 decides a result of the game (step 917) and transmits the game result to the game server 2 (step 918). However, the decision of the game result by the game server 2 instead of the terminal 6 is advantageous in fraud prevention, winners number control, display performance, and the like.

For example, in terms of fraud prevention, if the terminal 6 decides a result of the game, the terminal can fraudulently prepare a signal indicating a "win of the game" and transmit only the signal to the game server 2 to pretend that the user wins the game and fraudulently get the prize. The decision of game results by the game sever 2 can prevent such fraud.

In terms of the management of winners' number, when the total number of winners and/or prizes is fixed or when the number of winners and/or prizes is assigned based on terms and/or regions, the decision of game results by the terminal 6 and the decision of winners by the terminal 6 make the management difficult. The decision of game results by the game server 2 facilitates the management of the number of winners and prizes.

In terms of display performance, the decision of game results by the game server 2 allows the terminal 6 to dedicate to display performance, resulting in effective display performance. When the terminal 6 performs both the decision of game results and the display, the display takes time due to the processing speed or is not processed smoothly.

If some trouble occurs on the network and time delay occurs in displaying the game result to be received via the game server 2 by the terminal 6, it is possible to make the terminal 6 to continue the display performance until receiving the game result, thereby causing no discomfort to the customer in the course of playing the game.

At step 920, the game server 2 stores the game history data such as the game selection and the game result in the game history database 2g. At step 921, the game server 2 transmits the game history data to the advertiser terminal 9. At step 922, the advertiser terminal 9 receives the game history data. The game server 2 may transmit the game history data at the request of the advertiser terminal 9.

Examples of Display of Advertisement Information in Advertisement Distribution System According to Embodiment 1 of the Present Invention With reference to FIGS. 10 to 15, examples of display of advertisement information in the advertisement distribution system 1 in the present embodiment will be described. In this embodiment, advertisement information is graphically displayed. The advertisement information may be presented by sound or by the combination of image and sound.

FIG. 10 illustrates an example of display of advertisement information in the advertisement distribution system 1 according to the present embodiment. The terminal 6 displays a game screen 11 using distribution information received from the game server 2. As shown in FIG. 10, the game screen 11 consists of a plurality of game display elements 12a to 12i. The game display elements 12a to 12c are the same display information (a numeric character 7), and the game display elements 12g to 12i are the same display information (a picture of a dog).

As shown in FIG. 10, advertisement information 13 is displayed in place of at least one of game display elements (12d to 12f in FIG. 10) constituting the game screen 11. FIG. 10 illustrates a game screen of a slot machine game with a plurality of rotatable drums 11a to 11c on which the game display elements 12a to 12i or advertisement information pieces 13a to 13c are disposed. The advertisement information pieces 13a to 13c are the same display information (the substance of a product, that is, a picture of a video camera).

Figure 10A:
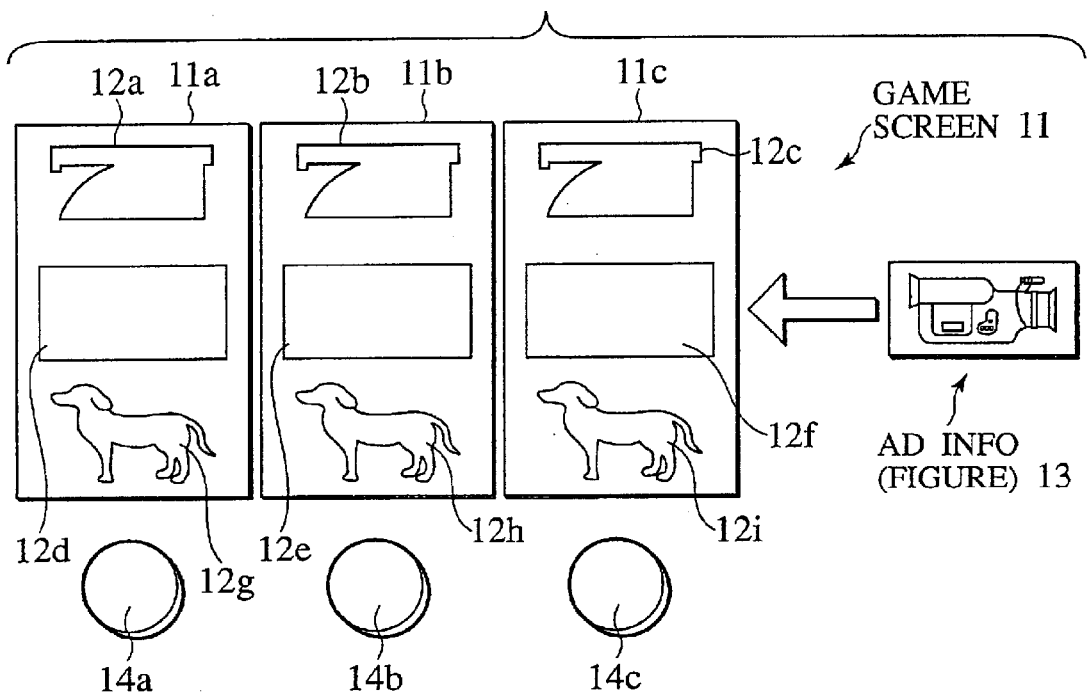
FIGS. 10($a$) and 10($b$) are diagrams exemplarily illustrating a game screen displayed on a terminal in the advertisement distribution system as shown in FIG. 2.
Figure 10B:
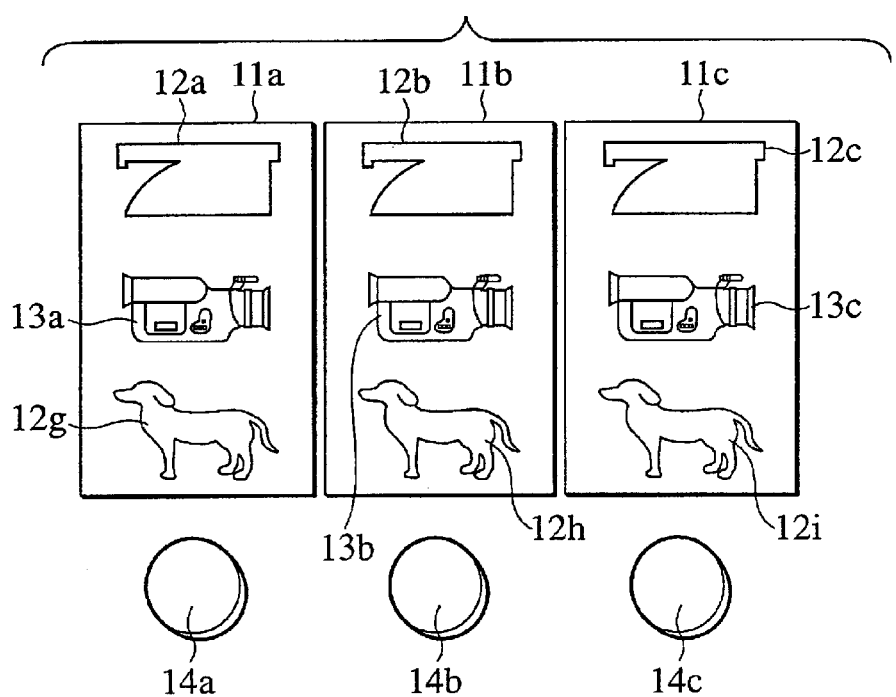

As shown in FIG. 10(b), the three drums 11a to 11c are displayed on the game screen 11 and the game display elements 12a to 12c and 12g to 12i and the advertisement information pieces 13a to 13c are displayed on the rotatable drums 11a to 11c.

The game display elements 12a to 12c and 12g to 12i may be characters, figures, and/or pictures as shown in FIGS. 10(a) and (b), depending on a game. The advertisement information pieces 13a to 13c may be graphical information, sound information, or a combination thereof, indicating an advertiser's name, a product name, a service name, the substance of a product, the substance of a service, or any combination thereof.

In this slot machine game, when a customer pushes selection buttons 14a to 14c to stop the rotating drums 13a to 13c and the advertisement information pieces 13a to 13c on the stopped drums 11a to 11c constitute a predetermined combination in at least one of a vertical, lateral or slanting direction (for example, the same pieces of advertisement information are aligned), it is determined as a "win of the game" and a product or service displayed by the advertisement information pieces 13a to 13c, a video camera in FIG. 10(b), is offered as a prize. When determining a "win of a game," the game server 2 stores the "winning history" in the game history database 2g.

The game server 2 may decide a result of a game as a "win of the game" when the advertisement information pieces 13a to 13c on the stopped drums 11a to 11c constitute a predetermined combination instead of the same information in at least one of a vertical, lateral, or slanting direction (for example, only one piece of advertisement information is different), and store the "winning history" in the game history database 2g. In such a case, the game server 2 stores the "winning history" with only one piece of advertisement information being different from the other pieces of advertisement information in the game history database 2g in a manner that it is distinguishable from a "winning history" with the same pieces of advertisement information aligned.

The game server 2 may make part of the game display elements (12d to 12f) included in the game information blank as shown in FIG. 10(a) and incorporate the advertisement information pieces 13a to 13c into the blank part so as to prepare distribution information with the advertisement information incorporated into the game information.

The above example of incorporating the advertisement information into part of the game information facilitates preparation of distribution information by merely incorporating advertisement information into game information prepared as the base in advance, and enables the preparation of distribution information with different advertisements only by replacing the advertisement information.

It is also possible to prepare distribution information using only advertisement information 13 without preparing game information as the base.

Figure 11:
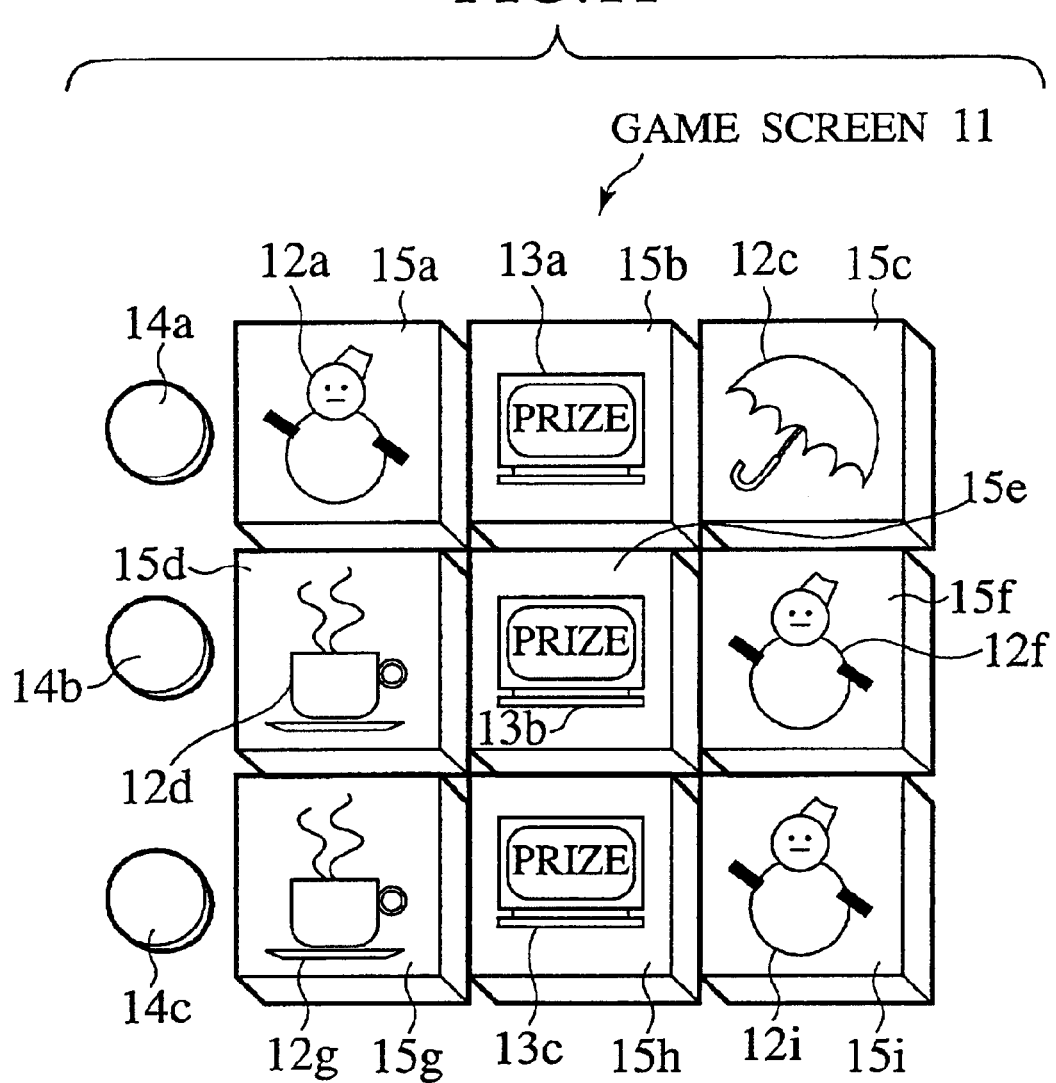
FIG. 11 is a diagram exemplarily illustrating a game screen displayed on a terminal in the advertisement distribution system as shown in FIG. 2.
Figure 12:
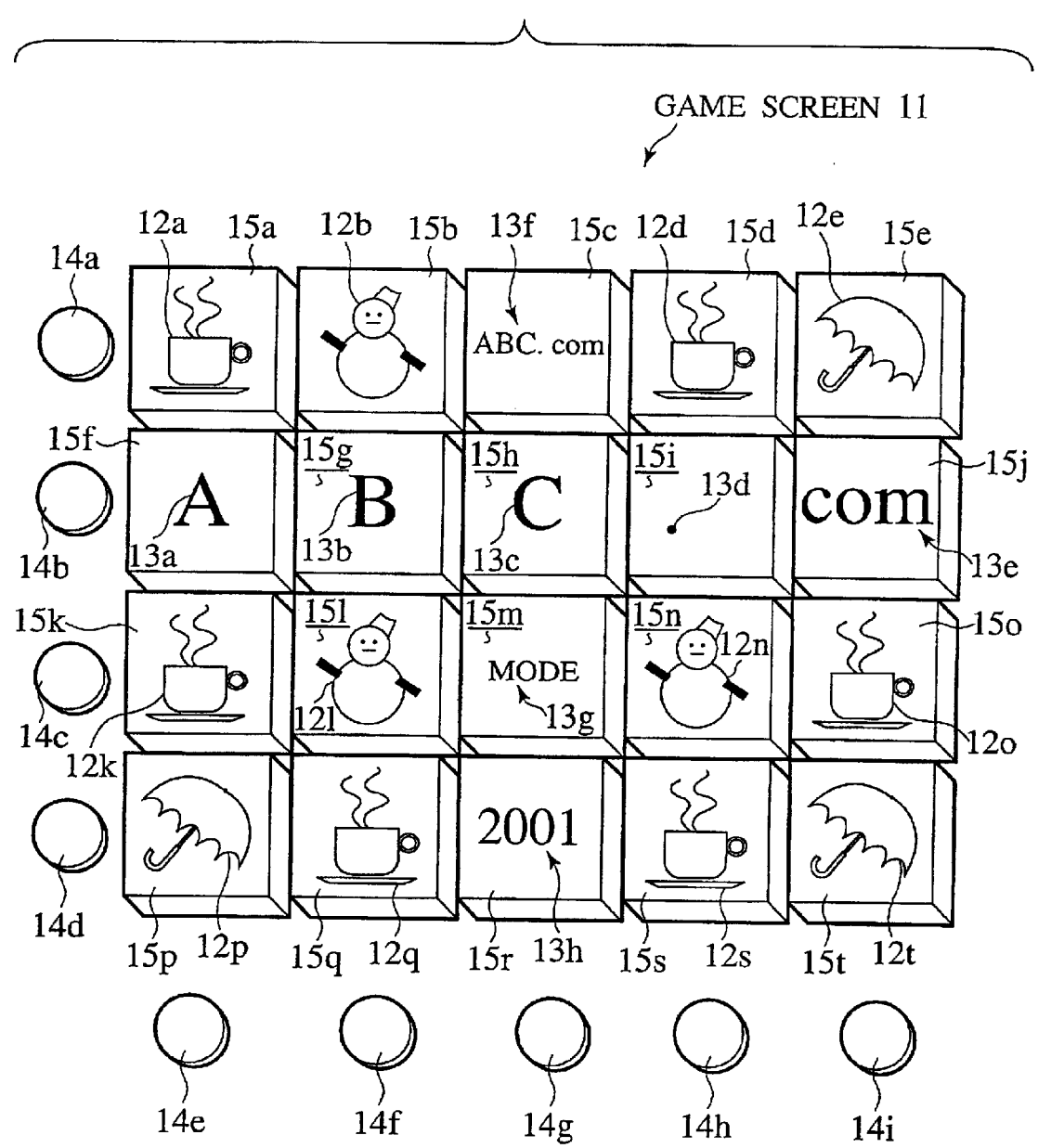
FIG. 12 is a diagram exemplarily illustrating a game screen displayed on a terminal in the advertisement distribution system as shown in FIG. 2.

FIGS. 11 and 12 illustrate other examples of display of advertisement information in the advertisement distribution system 1 according to the present embodiment. The terminal 6 displays a game screen 11 using distribution information received from the game server 2.

In the game illustrated in FIG. 11, nine game display elements 15a to 15i are arranged in a lattice on the game screen 11. In accordance with timing with which a customer pushes selection buttons 14a to 14c, predetermined game display elements and/or advertisement information are displayed on the game display elements 15a to 15i in a superimposing manner. The game server 2 prepares distribution information including the game display elements and/or the advertisement information selected by the terminal as described above and transmits it to the terminal 6.

Predetermined game display elements and/or advertisement information to be displayed are determined by the game program under a lottery system or the like. In FIG. 11, game display elements 12a, 12c, 12d, 12f, 12g, and 12i and advertisement information pieces 13a and 13c are displayed. The game display elements 12a, 12f and 12i are the same display information (a picture of a snowman). The game display elements 12d and 12g are the same display information (a picture of a coffee cup). The advertisement information pieces 13a to 13c are the same display information (a picture of a television set offered as a prize). The game display element 12c is display information illustrating a picture of an umbrella.

In this game, when the same advertisement information pieces 13a to 13c are aligned in at least one of a vertical, lateral, or slanting direction, for example, the decision of a "win of the game" is made, and the prize of a picture illustrated by the advertisement information pieces 13a to 13c (a television set in FIG. 11) is offered to the customer winning the game. FIG. 11 is the game screen 11 when the decision of a "win of the game" is made.

In the game illustrated in FIG. 12, twenty game display elements 15a to 15t are arranged in a lattice on the game screen 11 for display. In accordance with timing with which a customer pushes selection buttons 14a to 14d and selection buttons 14e to 14i, predetermined game display elements and/or advertisement information aligned in a lateral direction and a vertical direction are displayed on game display elements 15a to 15t in a superimposing manner.

That is, the game server 2 prepares distribution information containing the game display elements and advertisement information selected by the terminal as described above and transmits it to the terminal 6.

Predetermined game display elements and/or advertisement information to be displayed are determined by the game program under a lottery system. In FIG. 12, the game display elements 12a, 12b, 12d, 12e, 12k, 12l, 12n, 12o, 12p, 12q, 12s, and 12t, and advertisement information pieces 13a to 13h are displayed.

In this game, when advertisement information pieces 13a to 13h constitute a predetermined combination (such as a combination of an advertiser's name and a product name) in at least one of a vertical, lateral, or slanting direction, for example, the decision of a "win of the game" is made, and a prize shown by characters or a picture displayed by the predetermined combination of the advertisement information pieces is offered to the customer winning the game. FIG. 12 illustrates the game screen 11 when the decision of a "win of the game" is made.

On the game screen 11 in FIG. 12, the combination of advertisement information indicating an advertiser's name (ABC.com) is displayed on the game display elements 15f to 15j aligned in the second row. A combination of advertisement information indicating the name of a product or a service provided by the advertiser (ABC.com C mode 2001) is displayed on the game display elements 15c, 15h, 15m, and 15r aligned in the third column. Thus the combination of the advertiser's name and the name of a product or service is displayed. The prize corresponding to the product or service name displayed on the game display elements 15c, 15h, 15m and 15r aligned in the third column is offered in this case.

In the example of FIG. 12, advertisement information to be aligned in a vertical, lateral, or slanting direction may be advertisement information of different advertisers. In this case, advertisement information of a plurality of advertisers can be displayed on the same game screen 11.

FIG. 13 illustrates other examples of display of advertisement information in the advertisement distribution system 1 according to the present embodiment. The terminal 6 displays a game screen 11 using distribution information received from the game server 2.

In the game of FIG. 13, a plurality of game display elements 16 are arranged in a lattice on the game screen 11 for display. A customer selects one game display element 16 in each row and column from the plurality of game display elements 16, using the terminal 6. The game server 2 decides a "win of the game" according to the combination of the selected game display elements 16.

Figure 13A:
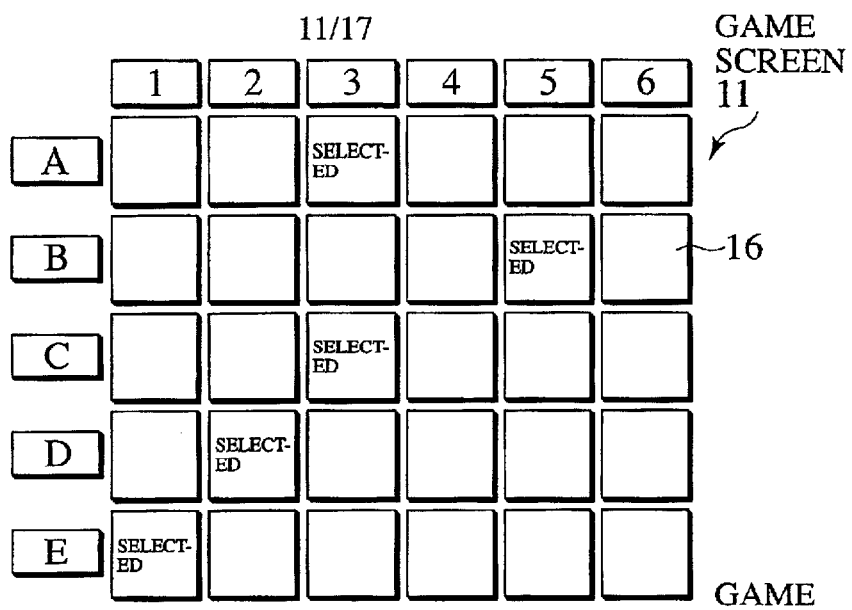
FIGS. 13($a$) to 13($c$) are diagrams exemplarily illustrating a game screen displayed on a terminal in the advertisement distribution system as shown in FIG. 2.

For example, FIG. 13(a) illustrates the game screen 11 when the customer selects one game display element 16 in each row and column from the game display elements 16, using the terminal 6. Specifically, in the "A" row, the game display element in the third column is selected. The selected game display element 16 is expressed as (A, 3). In the other rows, the game display elements (B, 5), (C, 3), (D, 2), and (E, 1) are selected.

Figure 13B:
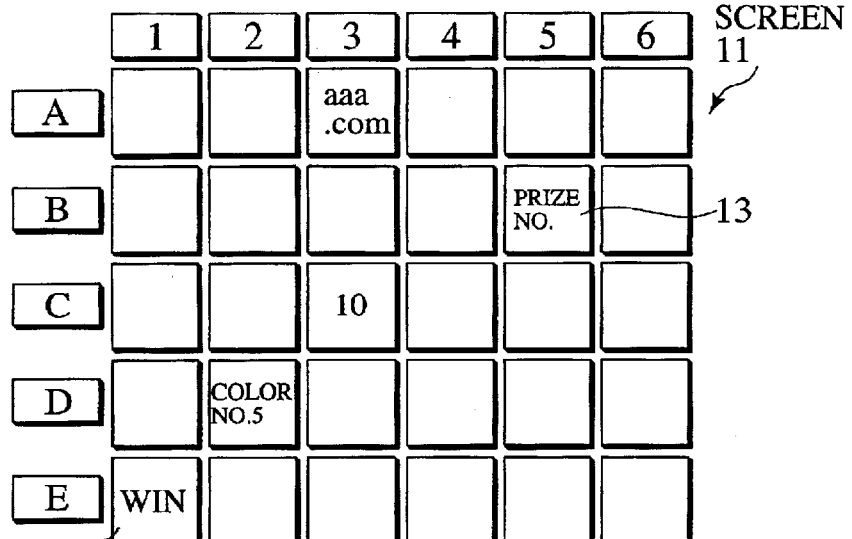

FIG. 13(b) illustrates an example of display of the game screen 11 when the customer wins the game. On the game screen 11 shown in FIG. 13(b), an advertiser's name, a prize number, advertisement information 13 of prize information, and the indication of a "win" (game display element) 17 which are associated with the selected game display elements 16 are displayed.

Figure 13C:
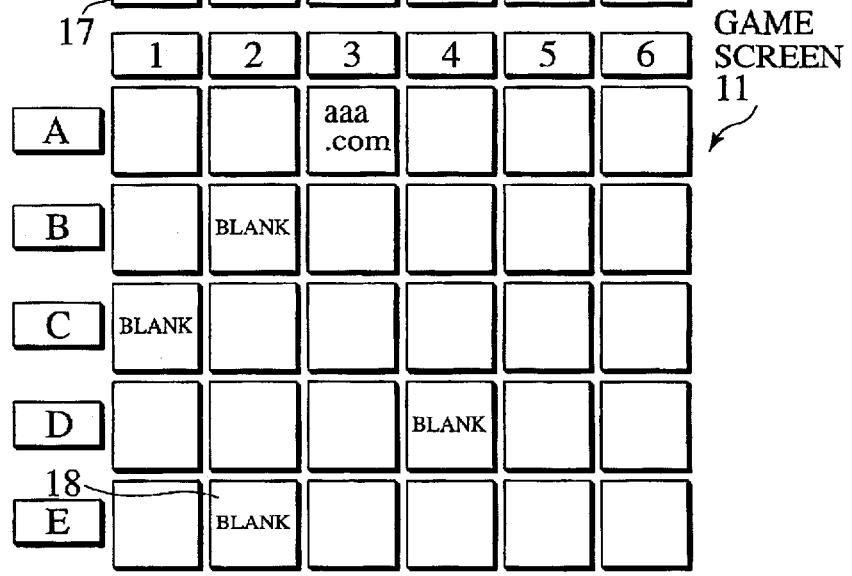

FIG. 13(c) illustrates an example of display of the game screen 11 when the customer loses the game. On the game screen 11 shown in FIG. 13(c), advertisement information 13 of an advertiser associated with the selected game display element 16 and the displays of "blanks" 18 associated with the selected game display elements 16 are displayed.

In the game shown in FIG. 13, the game server 2 prepares distribution information containing the game display elements ("win" 17 or "blank" 18) and/or advertisement information 13 associated with the game display elements 16 selected by the terminal 6 and transmits it to the terminal 6. The terminal 6 displays the game screen 11 using the distribution information received. The game server 2 stores a "winning history" in the game history database 2g when the terminal 6 selects predetermined advertisement information or a predetermined combination of advertisement information.

Figure 14A:
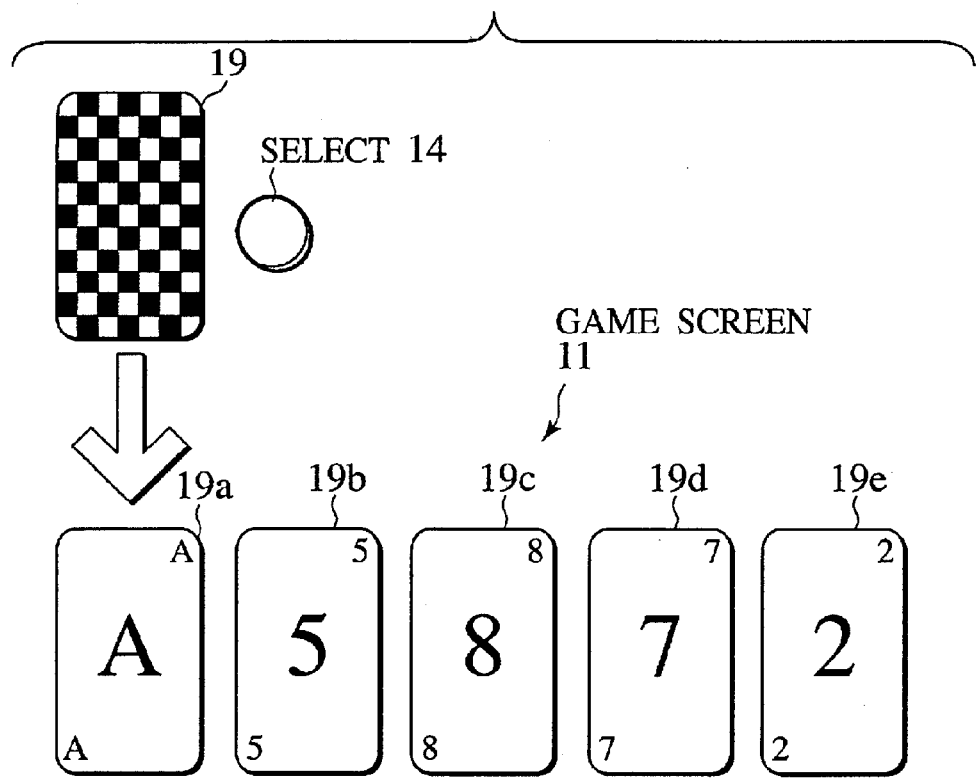
FIGS. 14($a$) and 14($b$) are diagrams exemplarily illustrating a game screen displayed on a terminal in the advertisement distribution system as shown in FIG. 2.

FIG. 14 illustrates other examples of display of advertisement information in the advertisement distribution system 1 according to the present embodiment. The terminal 6 displays a game screen 11 using distribution information received from the game server 2.

The game illustrated in FIG. 14 is a card game in which a customer pushes a selection button 14 and selects a predetermined number (five, for example) of cards (game display elements) 19a to 19e among a plurality of cards (game display elements) 19, and the decision of a "win of the game" depends on the combination of the selected cards.

In this game, the game server 2 prepares distribution information containing game display elements and/or advertisement information pieces 13a to 13e associated with the game display elements 19a to 19e selected by the terminal 6, and transmits it to the terminal 6. The terminal 6 uses the distribution information received and displays the game screen 11 including the advertisement information. The game server 2 stores a "winning history" in the game history database 2g when the terminal 6 has selected a predetermined combination of the advertisement information pieces 13a to 13d (a combination showing an advertiser's name and/or a product name, or the like).

Figure 14B:
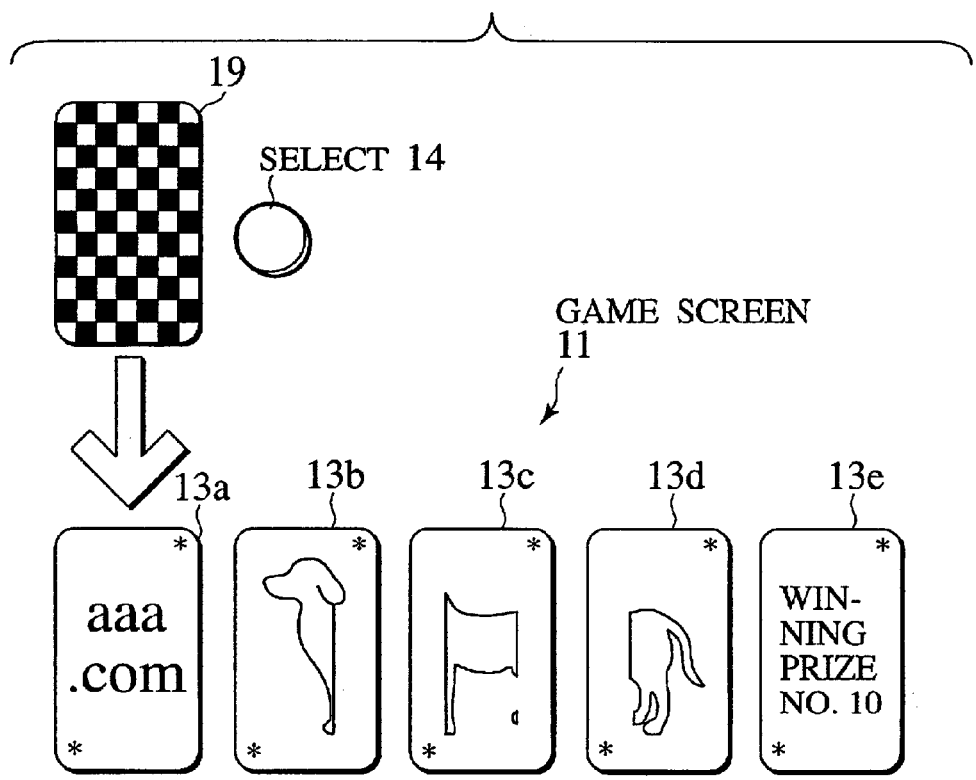

In FIG. 14, the advertisement information pieces 13a to 13e are displayed in place of the game display elements 19a to 19e. FIG. 14(b) illustrates the state where the advertisement information pieces 13a to 13e are displayed on the game screen 11. The terminal 6 displays an advertiser's name, information on a product or service, prize information, or the like, as the advertisement information.

The above-described examples of display of advertisement information are only for an illustrative purpose. It is also possible in another game to display advertisement information in place of game display elements so as to promote a product or service by displaying advertisement information when a customer is playing the game.

For example, the game server 2 prepares distribution information with advertisement information superimposed on a game screen according to results of a game executed by the terminal 6, using game information. For example, the game server 2 may prepare distribution information with a character (game display element) appearing in the game changed into advertisement information indicating the substance of a product/service. When having prepared predetermined advertisement information, that is, when the terminal 6 satisfies a predetermined condition when executing a game, the game server 2 may store the "winning history" in the game history database 2g.

An example of a game screen 11 in such a game is illustrated in FIG. 15. In FIG. 15, the terminal displays advertisement information 13 in place of an appearing character (game display element) on the game screen 11, using distribution information received from the game server 2.

Configuration of Advertisement Distribution System According to Embodiment 2 of the Present Invention An advertisement distribution system 1 according to embodiment 2 of the present invention will be described with reference to FIG. 16. In this embodiment, a game server 2 and an advertisement server 3 constitute a server for preparing distribution information containing game information and advertisement information and transmitting the prepared distribution information to a terminal 6. The advertisement distribution system 1 of this embodiment does not necessarily include a broadcast station 7.

Figure 16:
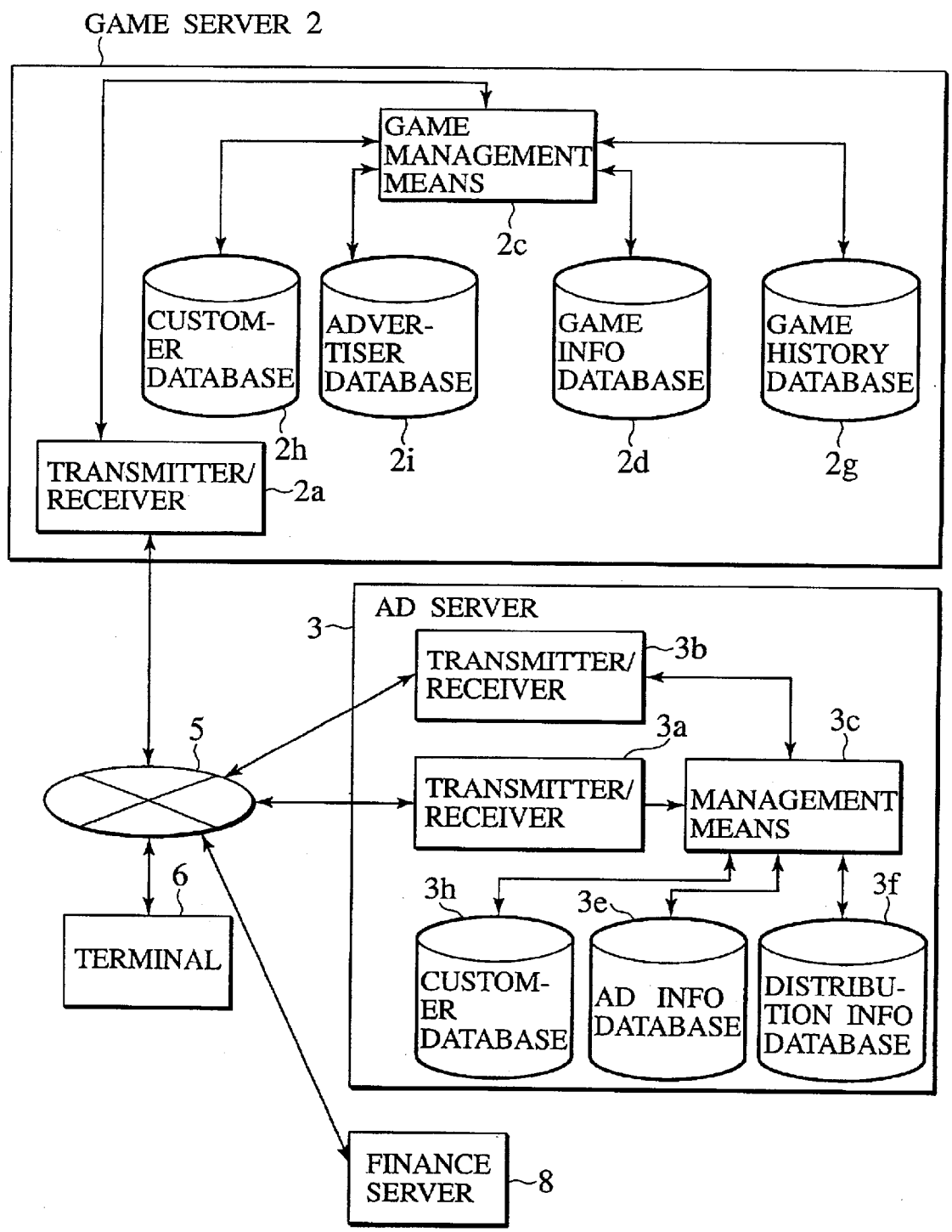
FIG. 16 is a functional block diagram illustrating an advertisement distribution system according to another embodiment of the present invention.

FIG. 16 illustrates an entire configuration of the advertisement distribution system 1 according to the present embodiment, and mainly illustrates functional blocks of the game server 2 and the advertisement server 3.

The game server 2 supplies game information to the advertisement server 3 via a network 5. The game server 2 is connected to the network 5 via a transmitter/receiver 2a.

The game server 2 includes, as shown in FIG. 16, a transmitter/receiver 2a, a game management means 2c, a game information database 2d, a game history database 2g, a customer database 2h, and an advertiser database 2i. The transmitter/receiver 2a, game management means 2c, game information database 2d, game history database 2g, customer database 2h and advertiser database 2i have substantially the same functions as those in embodiment 1.

The advertisement server 3 is connected through transmitters/receivers 3a and 3b to the terminal 6 and the game server 2 via the network 5. The advertisement server 3 cooperates with the game server 2 to perform promotion to the terminal 6 via the network 5. Specifically, the advertisement sever 3 imports game information from the game server 2 and incorporates advertisement information into the imported game information to prepare distribution information for transmission.

The advertisement server 3 includes, as shown in FIG. 16, the transmitter/receiver 3a, the transmitter/receiver 3b, a management means 3c, an advertisement information database 3e, a distribution information database 3f, and a customer database 3h.

The transmitter/receiver 3a is connected to the terminal 6 via the network 5. The transmitter/receiver 3b is connected to the game server 2 via the network 5.

The management means 3c is connected to the transmitter/receiver 3a, the transmitter/receiver 3b, the advertisement information database 3e, the distribution information database 3f, and the customer database 3h, and manages such various databases.

The management means 3c downloads game information through the transmitter/receiver 3b from the game server 2. The controller 3 reads predetermined advertisement information from the advertisement information database 3e, prepares distribution information by incorporating the advertisement information into the downloaded game information, and stores the prepared distribution information in the distribution information database 3f.

The management means 3c transmits through the transmitter/receiver 3a distribution information stored in the distribution information database 3f to the terminal 6 having transmitted an access request. The management means 3c manages the data of the customer of the terminal 6 having transmitted the access request using the customer database 3h. When supplying game information on a pay game, the management means 3c may perform registration processing for the customer and commission a finance server 8 to bill access charges as in the first embodiment.

The advertisement information database 3e, distribution information database 3f and customer database 3h can be the same as the advertisement information database 2e, distribution information database 2f and customer database 2h according to embodiment 1.

Operation of Advertisement Distribution System According to Embodiment 2 of the Present Invention With reference to FIG. 17, the operation of the advertisement distribution system 1 according to embodiment 2 of the present invention will be described below.

Figure 17:
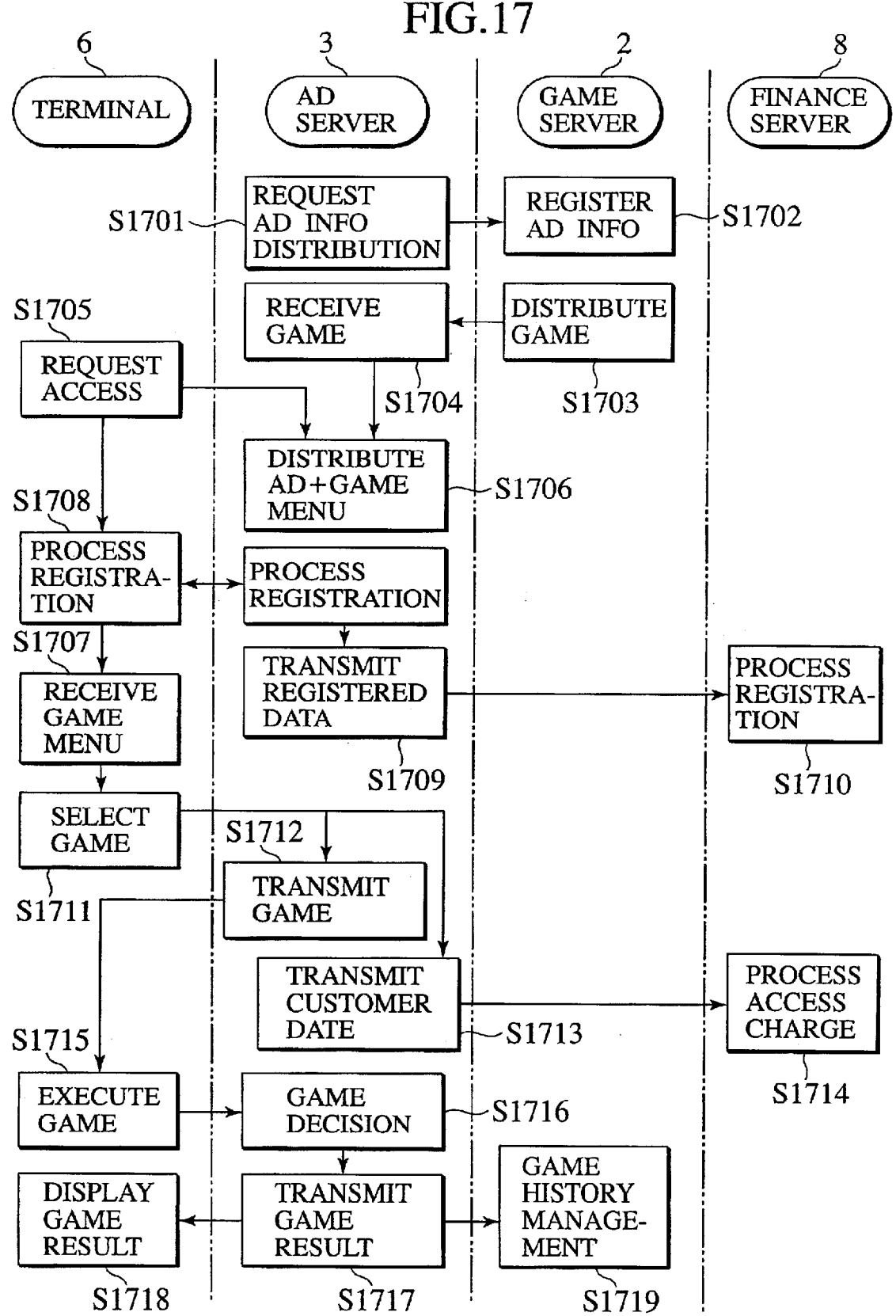
FIG. 17 is a flowchart illustrating the operation of the advertisement distribution system as shown in FIG. 16.

At step 1701 in FIG. 17, the game server 2 receives a request for the distribution of advertisement information relating to a given advertiser from the advertisement server 3. At step 1702, the game server 2 stores information on the advertiser in the advertiser data base 2i, and sets and registers game information specified by the advertiser in the game information database 2d. The setting or registration of the game information is carried out by associating existing game information with information on the advertiser, or creating new game information.

At step 1703, the advertisement server 3 downloads game information from the game server 2 via the network 5. At step 1704, the advertisement server 3 prepares distribution information by combining the downloaded game information with advertisement information stored in the advertisement information database 3e, and stores the prepared distribution information in the distribution information database 3f.

At step 1705, the advertisement server 3 receives an access request from the terminal 6. At step 1706, the advertisement server 3 transmits regular advertisement information and a game menu to the terminal 6. Here the advertisement server 3 may check whether the terminal 6 is registered or not through authentication using an ID code or the like identifying the terminal 6.

At step 1707, the terminal 6 displays a screen using the transmitted advertisement information and the game menu.

If the authentication with an ID code or the like is required and the customer is not yet registered, the terminal 6 and the advertisement server 3 cooperate to perform registration processing at step 1708. The registration can be used for identifying the user (customer) to play a pay game. Also performing registration processing even for a free game enables getting personal information of the user. The advertisement server 3 stores the customer data gained through the registration processing in the customer database 3h. It is also possible that the advertisement server 3 transmits the customer data to the game sever 2 and the game server 2 stores the customer data in the customer database 2h.

When a financial institution is commissioned to collect access charges for a pay game, the advertisement server 3 transmits the registered customer data to the finance server 8 at step 1709. The finance server 8 performs registration processing at step 1710.

At step 1711, the customer refers to the game menu displayed on the terminal 6 and selects a game to play. The terminal 6 transmits the selection result to the advertisement server 3.

At step 1712, the advertisement server 3 reads distribution information including game information relating to the selection result received, from the distribution information database 3f, and transmits it to the terminal 6. At step 1715, the terminal 6 displays a game screen using the transmitted distribution information to execute the game. On the game screen, the advertisement information as well as game display elements are displayed.

At step 1713, the advertisement server 3 transmits information on the selection of a pay game by the customer when the customer has selected the pay game, or information on which pay game the customer has selected to the finance server 8. At step 1714, the finance server 8 bills access charges to the customer based on the received information.

At step 1716, the advertisement server 3 decides a result of the game executed by the terminal 6. At step 1717, the advertisement server 3 transmits the game result to the terminal 6. At step 1718, the terminal 6 displays the received game result on the screen. At step 1717, the advertisement server 3 also transmits game history data such as the result of selection of the game by the customer and the game result to the game server 2. At step 1719, the game server 2 stores the received game history data in the game history database 2g.

Configuration of Advertisement Distribution System According to Embodiment 3 of the Present Invention An advertisement distribution system 1 according to embodiment 3 of the present invention will be described below with reference to FIG. 18. In this embodiment, a game server 2, an advertisement server 3, and a broadcast station 7 constitute a server for preparing distribution information containing game information and advertisement information and transmitting the prepared distribution information to a terminal 6.

Figure 18:
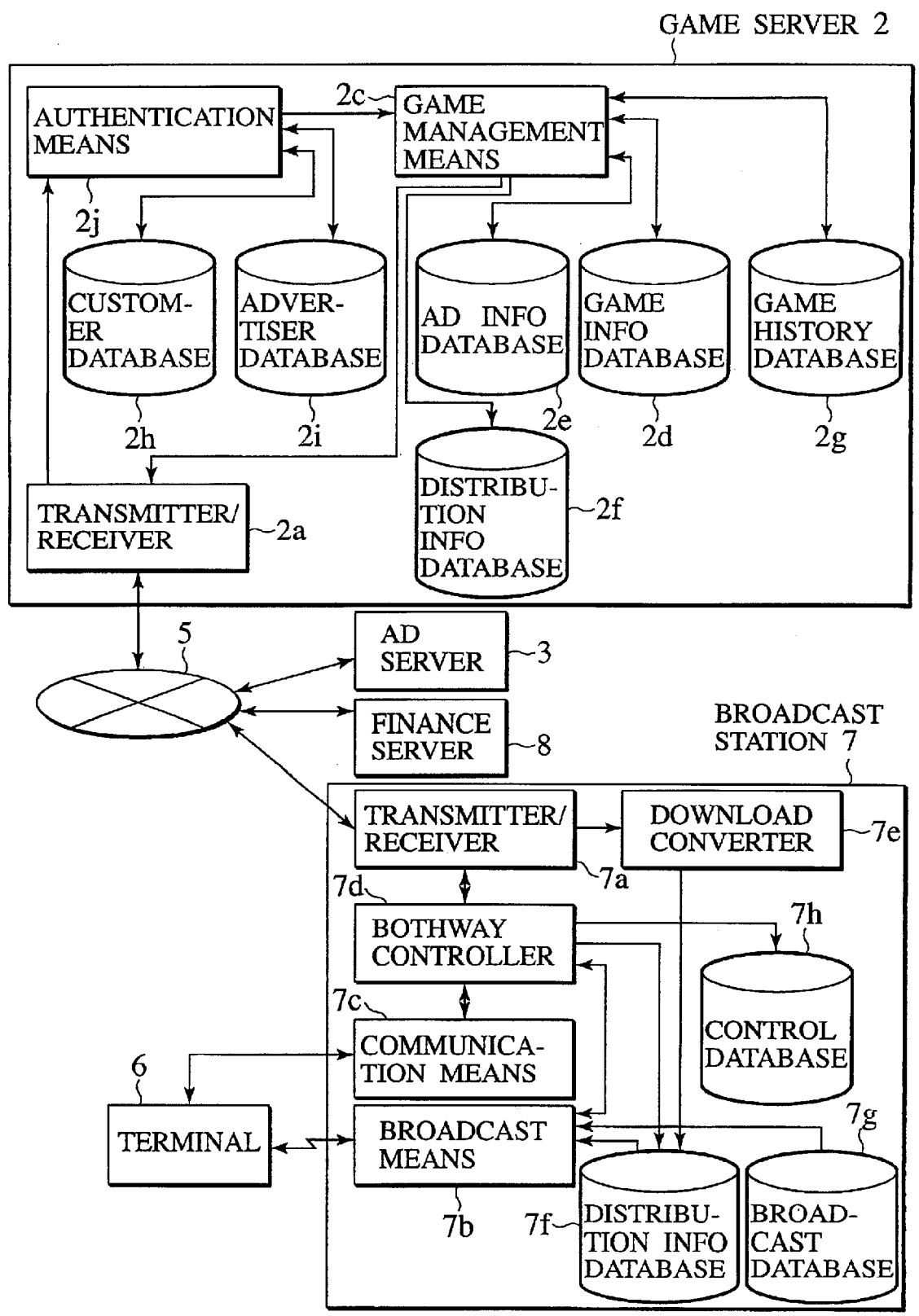
FIG. 18 is a functional block diagram illustrating an advertisement distribution system according to still another embodiment of the present invention.

FIG. 18 illustrates an entire configuration of the advertisement distribution system 1 according to this embodiment, and mainly illustrates functional blocks of the game server 2 and the broadcast station 7.

The game server 2 is connected to a network 5 via a transmitter/receiver 2a, imports advertisement information from the advertisement server 3 via the network 5, and transmits game information to the broadcast station 7.

In this embodiment, the game server 2 imports advertisement information from the advertisement server 3, prepares distribution information containing the imported advertisement information and game information stored in a game information database 2d, and transmits the prepared distribution information to the broadcast station 7. The game server 2 changes at least one game display element included in the game information into advertisement information to prepare distribution information.

The game server 2 includes, as shown in FIG. 18, the transmitter/receiver 2a, a game management means 2c, the game information database 2d, an advertisement information database 2e, a distribution information database 2f, a game history database 2g, a customer database 2h, an advertiser database 2i, and an authentication means 2j. These means and databases have the same functions as those in embodiment 1.

The broadcast station 7 constitutes a server for importing distribution information from the game server 2 and transmitting the imported distribution information by broadcasting, that is, together with broadcast information provided by the broadcast station 7, to the terminal 6.

The broadcast station 7 broadcasts broadcast programs to customers and performs data communications with the customers over communication lines such as telephone lines, establishing bothway communications. That is, the terminal 6 and the broadcast station 7 can establish bothway communications using communication lines such as telephone lines. The bothway communications allow communication processing during the execution of a game to be transmitted/received. The bothway communications may be used for transmitting/receiving distribution information.

The terminal 6 receives distribution information as well as broadcast information and produces a game screen for display using the game information and the advertisement information contained in the distribution information.

The broadcast station 7 includes, as shown in FIG. 18, a transmitter/receiver 7a connected to the network 5, a broadcast means 7b for transmitting broadcast information (broadcast programs) to the terminal 6, a communication means 7c connected to the terminal 6 with bothway communications such as a telephone line, a bothway controller 7d for controlling bothway communications, a download converter 7e for downloading distribution information from the game server 2, a distribution information database 7f for storing distribution information, a broadcast database 7g for storing broadcast information, and a control database 7h.

The broadcast means 7b is connected to the bothway controller 7d, distribution information database 7f and broadcast database 7g, and broadcasts distribution information read from the distribution information database 7f as well as broadcast information read from the broadcast database 7g to the terminal 6. The broadcast means 7b may transmit broadcast information and distribution information by, for example, BS broadcasting or CS broadcasting to the terminal 6.

The communication means 7c is connected to the bothway controller 7d, and establishes bothway communications with the terminal 6 according to a direction from the bothway controller 7d. The bothway controller 7d is connected to the communication means 7c, distribution information database 7f and control database 7h, and controls bothway communications between the communication means 7c and the terminal 6 using data stored in the control database 7h.

Operation of Advertisement Distribution System According to Embodiment 3 of the Present Invention With reference to FIG. 19, the operation of the advertisement distribution system 1 according to embodiment 3 of the present invention will be described below.

At step 1901, the game server 2 receives a request for the distribution of game information from an advertiser terminal 9 or an advertisement server 3. At step 1902, the game server 2 stores information on the advertiser having transmitted the distribution request in the advertiser database 2i, and sets and registers game information relating to the advertiser in the game information database 2d. The setting or registration of the game information can be carried out by associating existing game information with the information on the advertiser or creating new game information. The game server 2 stores distribution information with the advertisement information incorporated into the game information in the distribution information database 2f.

At step 1903, the game server 2 transmits the distribution information to the broadcast station 7 via the network 5. At step 1904, the broadcast station 7 stores the distribution information downloaded from the game server 2 via the network 5 in the distribution information database 10f.

At step 1905, the broadcast station 7 broadcasts the distribution information with broadcast information (broadcast programs). At step 1906, the terminal 6 receives airwaves by a receiver and displays a game screen as well as a broadcast program. Bothway communications are established between the terminal 6 and the broadcast station 7.

At step 1907, the user performs an operation to participate in a game displayed on the terminal 6. At step 1908, the terminal 6 transmits information to participate in the game.

At step 1909, the broadcast station 7 or the game server 2 performs authentication using an ID code or the like included in the information transmitted from the terminal 6. If necessary, at step 1910, the terminal 6, broadcast station 7 and game server 2 cooperate to perform registration processing. The registration is used for identifying a customer to play a pay game, and also is used for gaining personal information of a user registered even for playing a free game. At step 1911, the broadcast station 7 transmits the registration data and data of a customer having transmitted an access request to the advertisement sever 3 or the advertiser terminal 9.

In the registration processing, the broadcast station 7 stores the obtained customer data in the customer data base 2h in the game server 2. When a financial institution is commissioned to collect access charges for a pay game, the broadcast station 7 transmits the registered customer data to the finance server 8 to make the financial institution perform registration processing.

The authentication and registration processing can be performed by either of the broadcast station 7 and the game server 2. When the processing is performed by the broadcast station 7, the broadcast station 7 is provided with a customer database. When the processing is performed by the game server 2, the broadcast station 7 transmits information transmitted from the terminal 6 to the game server 2 via the network 5.

At step 1912, the broadcast station 7 broadcasts a game menu to the terminal 6. At step 1913, the terminal 6 displays the game menu received. At step 1914, the customer refers to the game menu displayed on the terminal 6 and selects a game to execute. The terminal 6 transmits the selection result to the broadcast station 7 via bothway communications.

At step 1915, the broadcast station 7 receives the selection result via the communication means 10c, reads distribution information associated with the selected game from the distribution information database 10f, and broadcasts the information via the broadcast means 7b.

At step 1916, the terminal 6 displays a game screen using the distribution information received to execute the game. The advertisement information is also displayed on the game screen.

At step 1917, the terminal 6 transmits information on the execution of the game to the broadcast station 7. The broadcast station 7 decides a result of the game based on the information received. At step 1918, the broadcast station 7 broadcasts the game result to the terminal 6. At step 1918, the broadcast station 7 also transmits the game result to the game server 2 via the network 5. At step 1919, the terminal 6 displays the game result. At step 1920, the game server 2 stores the game result in the game history database 2g for management. At step 1921, the game server 2 transmits the game history data to the advertisement sever 3 via the network, or directly to the advertiser terminal 9. At step 1922, the advertisement server 3 or the advertiser terminal 9 receives the game history data.

Modification

The above-described embodiments are not intended to limit the present invention to the forms disclosed therein. The present invention can also be applied to a configuration in which the broadcast station 7 imports game information and advertisement information from the game server 2 via the network 5, prepare distribution information containing the imported advertisement information and game information, and transmits the prepared distribution information to the terminal 6 by means of broadcasting.

Further, the present invention can also be applied to a configuration in which the broadcast station 7 imports advertisement information from the advertisement server 3 via the network 5 and imports game information from the game server 2, prepares distribution information containing the imported advertisement and game information, and transmits the prepared distribution information to the terminal 6 by means of broadcasting.

What is claimed is:

1. An advertisement distribution system, comprising:
    a server preparing distribution information including game information and advertisement information for transmission, and
    at least one terminal receiving the said distribution information from the said server, the terminal displaying a game screen using the game information included in the distribution information, and displaying the advertisement information included in the distribution information on the game screen, wherein
        the game information includes a plurality of game display elements constituting the game screen,
        the server changes at least one of the game display elements included in the game information into the advertisement information, thereby preparing the distribution information, and
        the server decides a win of a game executed by the terminal using the game information when predetermined advertisement information or a predetermined combination of the advertisement information are displayed on the game screen.

2. The advertisement distribution system as set forth in claim 1, wherein the server prepares the distribution information including the game display elements and/or the advertisement information which have been selected by the terminal.

3. The advertisement distribution system as set forth in claim 1, wherein the server stores a winning history when deciding the win of the game.

4. The advertisement distribution system as set forth in claim 1, wherein the server prepares the distribution information based on a result of the game.

5. The advertisement distribution system as set forth in claim 1, wherein the server stores a winning history when having prepared predetermined distribution information.

6. The advertisement distribution system as set forth in claim 1, wherein
the game is a slot machine game with a plurality of rotatable drums on which the game display elements and/or the advertisement information are disposed; and
the server decides the win of the game when the advertisement information on the drums constitutes a predetermined combination in at least one of a vertical, lateral or slanting direction.

7. The advertisement distribution system as set forth in claim 1, wherein
the server comprises a game server storing the game information and an the advertisement server storing the advertisement information; and
the game server imports the advertisement information from the advertisement server, and prepares the distribution information including the advertisement information imported and the game information stored therein.

8. The advertisement distribution system as set forth in claim 1, wherein
the server comprises a game server storing the game information and the advertisement information, and a broadcast station; and
the broadcast station imports the game information and the advertisement information from the game server, prepares the distribution information including the imported advertisement and game information, and transmits the prepared distribution information to the terminal by means of broadcasting.

9. The advertisement distribution system as set forth in claim 1, wherein
the server comprises an advertisement server storing the advertisement information, a game server storing the game information, and a broadcast station; and
the broadcast station imports the advertisement information from the advertisement server, imports the game information from the game server, prepares the distribution information including the imported advertisement and game information, and transmits the prepared distribution information to the terminal by means of broadcasting.

10. The advertisement distribution system as set forth in claim 1, wherein
the server comprises an advertisement server storing the advertisement information, a game server storing the game information, and a broadcast station;
the game server imports the advertisement information from the advertisement server and prepares the distribution information including the imported advertisement information and the game information stored therein; and
the broadcast station imports the distribution information from the game server and transmits the imported distribution information to the terminal by means of broadcasting.

11. The advertisement distribution system as set forth in claim 1, wherein the server transmits a winning history to an advertiser terminal, when deciding the win of the game.

12. The advertisement distribution system as set forth in claim 1, wherein the server comprises authentication means for determining whether an advertiser terminal is registered or not, when receiving an access request from the advertiser terminal.

13. A server comprising:
means for preparing distribution information including game information and advertisement information; and
means for transmitting the prepared distribution information to a terminal, the terminal displaying a game screen using the game information included in the distribution information, and displaying the advertisement information included in the distribution information on the game screen, wherein
the game information has a plurality of game display elements constituting the game screen;
at least one of the game display elements is changed into the advertisement information for the preparation of the distribution information; and
a decision of a win of a game executed by the terminal using the game information is made when predetermined advertisement information or a predetermined combination of said advertisement information are displayed on the game screen.

14. The server as set forth in claim 13, wherein the means for preparing prepares the distribution information including the game display elements and/or the advertisement information which have been selected by the terminal.

15. The server as set forth in claim 13, further comprising means for storing a winning history when the decision of the win of the same is made.

16. The server as set forth in claim 13, further comprising means for preparing the distribution information based on a result of the game.

17. The server as set forth in claim 13, further comprising means for storing a winning history when having prepared predetermined distribution information.

18. The server as set forth in claim 13, wherein
the game is a slot machine game with a plurality of rotatable drums on which the game display elements and/or the advertisement information are disposed; and
the decision of the win of the game is made when the advertisement information on the drums constitutes a predetermined combination in at least one of a vertical, lateral, or slanting direction.

19. The server as set forth in claim 13, further comprising means for transmitting a winning history to an advertiser terminal, when the decision of the win of the game is made.

20. The server as set forth in claim 13, further comprising means for determining whether an advertiser terminal is registered or not, when an access request from the advertiser terminal is received.

* * * * *